United States Patent [19]

Tu et al.

[11] Patent Number: 4,799,003

[45] Date of Patent: Jan. 17, 1989

[54] MECHANICAL-TO-ELECTRICAL ENERGY CONVERTER

[76] Inventors: Xuan M. Tu, Rue de la Blancherie 34, CH-1022 Chavannes; Daho Taghezout, Rue du Tombet 20, CH-2034 Peseux, both of Switzerland

[21] Appl. No.: 55,196

[22] Filed: May 28, 1987

[51] Int. Cl.[4] .................... H02D 9/04

[52] U.S. Cl. .................... 322/29; 322/8; 320/61; 290/1 E

[58] Field of Search .................... 322/7, 8, 29, 32; 290/1 E; 320/61

[56] References Cited

U.S. PATENT DOCUMENTS

| | | | |
|---|---|---|---|
| 3,914,706 | 10/1975 | Hammer et al. . | |
| 3,937,001 | 2/1976 | Berney | 322/29 |
| 4,169,992 | 8/1979 | Nash | 322/29 |
| 4,371,821 | 2/1983 | Laesser et al. | 318/696 |

FOREIGN PATENT DOCUMENTS

| | | |
|---|---|---|
| 2118057 | 4/1971 | Fed. Rep. of Germany . |
| 2125224 | 11/1972 | Fed. Rep. of Germany . |
| 2138117 | 12/1972 | France . |
| 2249378 | 10/1974 | France . |
| 59-135388 | 3/1984 | Japan . |
| 2006998 | 5/1979 | United Kingdom . |

OTHER PUBLICATIONS

Swiss Search Report for CH 1247/86, dated Dec. 15, 1986.

European Search Report for EP No. 87 10 3046, dated Jul. 3, 1987.

*Primary Examiner*—Patrick R. Salce
*Assistant Examiner*—Anita M. Ault
*Attorney, Agent, or Firm*—Kevin McMahon

[57] ABSTRACT

The converter described comprises a generator (2) having a rotor (3) driven by a spring (1) via a gear-train (4), and means (11) for electrically braking the rotor (3). In one form of embodiment of the converter, the mean rotational speed of the rotor (3) is adjusted to a predetermined set speed by a control circuit (12) which periodically cuts out the braking means (11) in response to a reference signal having a period equal to the ratio between a predetermined rotational angle of the rotor (3) and the set speed. The control circuit (12) cuts the braking means (11) in again after a length of time which varies in response to a signal generated by a circuit (26, 27) for comparing the real angular position of the rotor (3) at the beginning of each period of the refernce signal with the angular position it should be in when running at the set speed.

The converter may for instance be used in a timepiece having hands (9) that are also driven by the spring (1).

11 Claims, 8 Drawing Sheets

MECHANICAL-TO-ELECTRICAL ENERGY CONVERTER

FIELD OF THE INVENTION

This invention relates to a mechanical to electrical energy converter.

Cells and batteries used in portable devices, such as electronic timepieces, cameras or radio receivers, have many drawbacks. In particular, their life span is limited, which implies relatively frequent replacement, and they are often not perfectly fluidtight, which can be the cause of damage to the devices they are meant to energize.

It has been suggested replacing these cells and batteries by converters having a rotary electric-energy generator rotatably driven by a mechanical energy source.

PRIOR ART

Swiss Patent Specification No. CH-B-597636, for example, describes an electronic timepiece whose electric energy is supplied by such a converter. In this converter, the mechanical energy source consists of a barrel spring of the well-known kind used, for instance, to drive mechanical timepieces of small size, linked to a manual or automatic winding mechanism.

The electrical energy generator described in Patent Specification No. CH-B-597636 comprises six permanent magnets mounted on a rotor rotatably driven by the spring, via a gear-train. It further comprises a stationary coil, located close to the rotor, such that displacement of the permanent magnets with respect to the coil will induce in the latter an alternating voltage.

The converter additionally comprises a rectifying circuit for transforming the alternating voltage generated by the coil in response to rotation of the magnets into a rectified voltage, and a storing and filtering capacitor for temporarily storing the electric energy produced by the generator and returning it in the form of a substantially direct voltage.

The timepiece described in Patent Specification No. CH-B-597636 further comprises time-display hands also linked to the spring by at least part of the gear-train connecting the spring to the rotor of the generator.

The average speed of rotation of the hands, which must of course have a clearly defined value, is controlled by an electronic circuit for regulating the average speed of rotation of the generator's rotor.

This regulating circuit is energized with the substantially direct voltage that is present across the terminals of the storage capacitor mentioned above. It has electrical braking means connected in parallel with the storage capacitor, and a circuit for controlling the braking means. The latter are made up of a braking resistor and an electronic on-off switch that are connected in series.

The control circuit for the braking means comprises a source, issuing a reference signal having a clearly defined frequency.

The reference signal source is made up of a quartz oscillator connected to the input of a frequency dividing circuit whose output issues a reference signal in the form of pulses.

The control circuit further comprises a reversible or up-down counter whose down counting input receives the reference signal and whose up counting input receives a measuring signal having a frequency equal to the frequency of the alternating voltage generated by the coil, and thus proportional to the speed of rotation of the rotor.

The reversible counter generates a signal which closes the switch connected in series with the braking resistor when its contents are greater than zero, and which opens this switch in the opposite case.

The various components of the gear-train are so sized that were the rotor to rotate constantly at a speed such that the frequency of the masurement signal equals that of the reference signal, the time-display hands would rotate at their normal speed, i.e. one rotation every twelve hours for the hours hand, one rotation every hour for the minutes hand and one rotation every minute for the seconds hand when provided.

This rotational speed of the rotor is referred to as the set speed Vc in the following description.

The components of the converter are so sized that when the switch is open, i.e. when the braking resistor is not connected to the terminals of the storage capacitor, the rotor is accelerated to a speed greater than Vc in response to the torque applied to it by the spring via the gear-train.

The components of the converter are also so sized that when the switch is closed, with the braking resistor thus connected in parallel with the storage capacitor, the rotor is slowed down to a speed which is, on average, less than Vc in response to the electrical braking torque that results from connecting the braking resistor in parallel with the storage capacitor.

Under these conditions, the instantaneous speed of the rotor will clearly oscillate above and below Vc.

In particular, when the contents of the reversible counter are less than zero, the switch is open and the rotor is accelerated. When its speed becomes greater than Vc, the frequency of the measurement signal becomes higher than the frequency of the reference signal. The reversible counter is thus incremented faster than it is decremented, and its contents increase. When the contents become greater than zero, the reversible counter closes the switch that is connected in series with the braking resistor. From then on, the rotor is braked and its speed decreases.

When this speed becomes less than Vc, the frequency of the measurement signal becomes lower than that of the reference signal. The reversible counter is thus decremented faster than it is incremented, and its contents decrease. When the contents become less than zero, the reversible counter reopens the switch. From then on, the rotor is no longer braked, its speed increases, and the process described above starts all over again.

When measured over a sufficiently long period, the average speed of the rotor is indeed found to equal Vc.

The rotor of the generator described above suffers from a serious drawback in that it has a high inertia, thus rendering it very sensitive to all kinds of shocks to which the timepiece may be subjected. Furthermore, the coil of the generator has no core, which makes it more complicated and more costly to produce and prohibits providing it with a high number of turns.

To overcome these drawbacks, it is possible to replace the generator described above by that described in the specification of Japanese Patent Application No. JP-A-52-85851, which is far more suited for use in a timepiece.

This generator is similar to stepping motors commonly used in electronic timepieces. It has a rotor comprising a single bipolar magnet coupled magnetically to a coil via a stator.

As in stepping motors, the stator of this generator comprises a pair of pole faces that almost completely surround the rotor and which form each the end portion of a pole piece, the opposite end portion of the latter being connected to a respective end of the core of the coil. The pole faces are separated by air-gaps positioned symmetrically with respect to the axis of the rotor.

However, this stator is devoid of notches, or other means, which in motors are used for generating a torque for positioning the rotor.

For a converter such as that described above, loss due to mechanical friction of the various moving parts with each other and within their bearings is directly proportional to the rotor's set speed Vc. Furthermore, loss by hysteresis and by eddy currents in the stator of the generator, if any, is proportional respectively to Vc and to its square.

It is thus imperative to choose for Vc a value as low as possible for the efficiency of the converter to be as high as possible, and for the autonomy of the latter, i.e. the length of time during which it can operate without needing to wind the spring which supplies its mechanical energy, to be as long as possible.

In the converter described in Patent Specification No. CH-B-597636, the braking resistor remains active as long as the contents of the reversible counter are greater than zero. It is thus possible for the rotor to be braked uninterruptedly for quite a long time, particularly after having been strongly accelerated by some angular shock.

Moreover, the instants when the braking resistor is rendered active or inactive occur in a virtually random manner with respect to the angular position of the rotor. It is thus also possible during several consecutive turns of the rotor for the alternating voltage produced by the coil of the generator to be close to zero between each of the above activation instants and the following deactivation instant, and for the generator thus not to supply any electrical energy.

To prevent the supply voltage of the eletronic circuits from dropping too much in such cases, it is necessary for the dimensions of the converter to be such that the generator will continue to supply the electrical energy that is needed by the circuits even when the rotor is being braked.

The rotational speed of the rotor when being braked must thus not be chosen too low, as otherwise the number of turns of the coil of the generator would need to be very great to satisfy the above condition and the size of the coil would then be incompatible with the space available in a small timepiece. Alternatively, if the diameter of the coil's wire is chosen sufficiently small for the coil not to be too large, it would become technically difficult to manufacture the coil and its cost price would become too high.

As is known, the voltage generated by the coil depends not only on the number of its turns and on the speed of rotation of the rotor, but also on the number of poles of the permanent magnet and on the amount of magnetic flux generated by the magnet and flowing through the coil. This magnetic flux is commonly termed "coupled" or "mutual" flux.

It would therefore be theoretically possible to increase one or both of these last two factors in order to increase the voltage generated by a coil, having a relatively low number of turns, in response to the rotation of a slowly moving rotor.

However, these increases are not feasible in practice. Firstly, multipolar permanent magnets are difficult to make, and are thus costly. Moreover, for a given material and a given volume, the product of the coupled flux times the number of pairs of poles in the magnet decreases when this number of pairs of poles increases.

Secondly, an increase in the coupled flux requires a decrease in the width of the air-gap that separates the permanent magnet from the stator surrounding it or the use of a magnet having a greater coercitive field. These modifications cause a narrowing of the tolerances acceptable for the manufacture of the stator and of the magnet, and thus an increase in their cost price. Furthermore, these modifications also cause an increase in the residual positioning torque of the rotor and in the friction of its shaft in its bearings, this torque and this friction being caused by the inaccuracies which are always to be found in the actual size and actual relative positions of the magnets and of the stator. Finally, these modifications cause an increase in the losses of magnetic origin in the stator.

Again to enable the use of a coil having a number of turns which is not too great and the choice of a low value for the rotational speed of the rotor, it would also be theoretically possible to use a voltage-multiplying rectifier for rectifying the voltage generated by the coil. But such rectifiers involve a large number of capacitors, which are cumbersome components. In practice, it is only possible to use, in a device such as that described above, simple, i.e. non voltage-multiplying, rectifiers or, at best, voltage-doubling rectifiers.

It follows from the above that the rotational speed of the rotor of the generator of a converter such as that described in Patent Specification No. CH-B-597636 has to be chosen with a relatively high value when being braked. The rotor's set speed Vc, which must of course be greater, cannot therefore be given an arbitrarily low value.

Since the efficiency of the converter improves when the value of Vc is lowered, the latter is chosen as close as possible to the speed of the generator's rotor when it is being braked. Consequently the converter's components must be so sized that the speed of the generator's rotor, when not being braked, will also be close to Vc. The variations in the instantaneous speed of the rotor around Vc are thus small.

Theoretical considerations, not discussed here but confirmed by practical tests, have shown that Vc above cannot be less than 8 to 10 revolutions per second if the size of the generator's coil is to be compatible with the space available within a timepiece such as a wrist watch, and if the diameter of the coil's wire is to be compatible with mass production techniques and low cost price requirements.

The same considerations and the same tests show that, with such a set speed, the efficiency and the autonomy of the converter are inadequate for the latter to be of practical use in a timepiece of small size.

The converter described in Patent Specification No. CH-B-597636 suffers from a further drawback, due to the fact that the braking means for the rotor are connected directly in parallel with the capacitor for storing the electric energy produced by the generator.

When the on-off switch that is connected in series with the braking resistor is closed, the storage capacitor discharges into the resistor, and part of the energy that is dissipated in the braking resistor is supplied by the storage capacitor. The slowing down of the rotor is thus less efficient than when the energy that is dissipated in the braking resistor is supplied by the generator alone. Moreover, the overall efficiency of the converter is diminished because the energy from the storage capacitor that is dissipated in the braking resistor is not being used to energize the circuits for which it was intended.

SUMMARY OF THE INVENTION

An object of the invention is to provide a converter of the kind described above, but without its drawbacks, i.e. a converter wherein the set speed of the generator's rotor can be chosen sufficiently low to achieve improved efficiency and autonomy for the converter, wherein the number of turns of the generator's coil is still low enough to enable it to be manufactured in a sufficiently small size and at a sufficiently low cost, and wherein the generator will at all times safely supply a sufficient amount of energy for the voltage across the terminals of the storage capacitor permanently to remain sufficiently high for the electronic circuits energized by this voltage to operate correctly.

According to the invention there is provided a mechanical-to-electrical energy converter which comprises:

an electrical energy generator having a rotor and means for generating said electrical energy in response to rotation of said rotor;

means for storing at least temporarily said electrical energy;

a mechanical energy source connected mechanically to said rotor and able to generate a mechanical driving torque for driving said rotor at a first speed greater than a predetermined set speed in the absence of any other influence;

means for generating a periodic reference signal having a period equal to the ratio between a predetermined angle of rotation of said rotor and said set speed;

means for generating a control signal having first and second states; and means for electrically braking said rotor able to respond to said first state of the control signal to induce the application to the rotor of a braking torque opposed to said mechanical driving torque and imposing on said rotor a second speed lower on average than said set speed and able to respond to said second state of the control signal to stop the application to the rotor to said braking torque;

said means for generating a control signal including means for putting said control signal into one of said states at each one of a plurality of first instants that follow each other periodically with a period equal to that of said reference signal, and means for putting said control signal into the other of said states at second instants, each separated from the immediately preceding first instant by a time interval having a length less than said reference signal period.

DETAILED DESCRIPTION OF THE DRAWINGS

Figure 1:
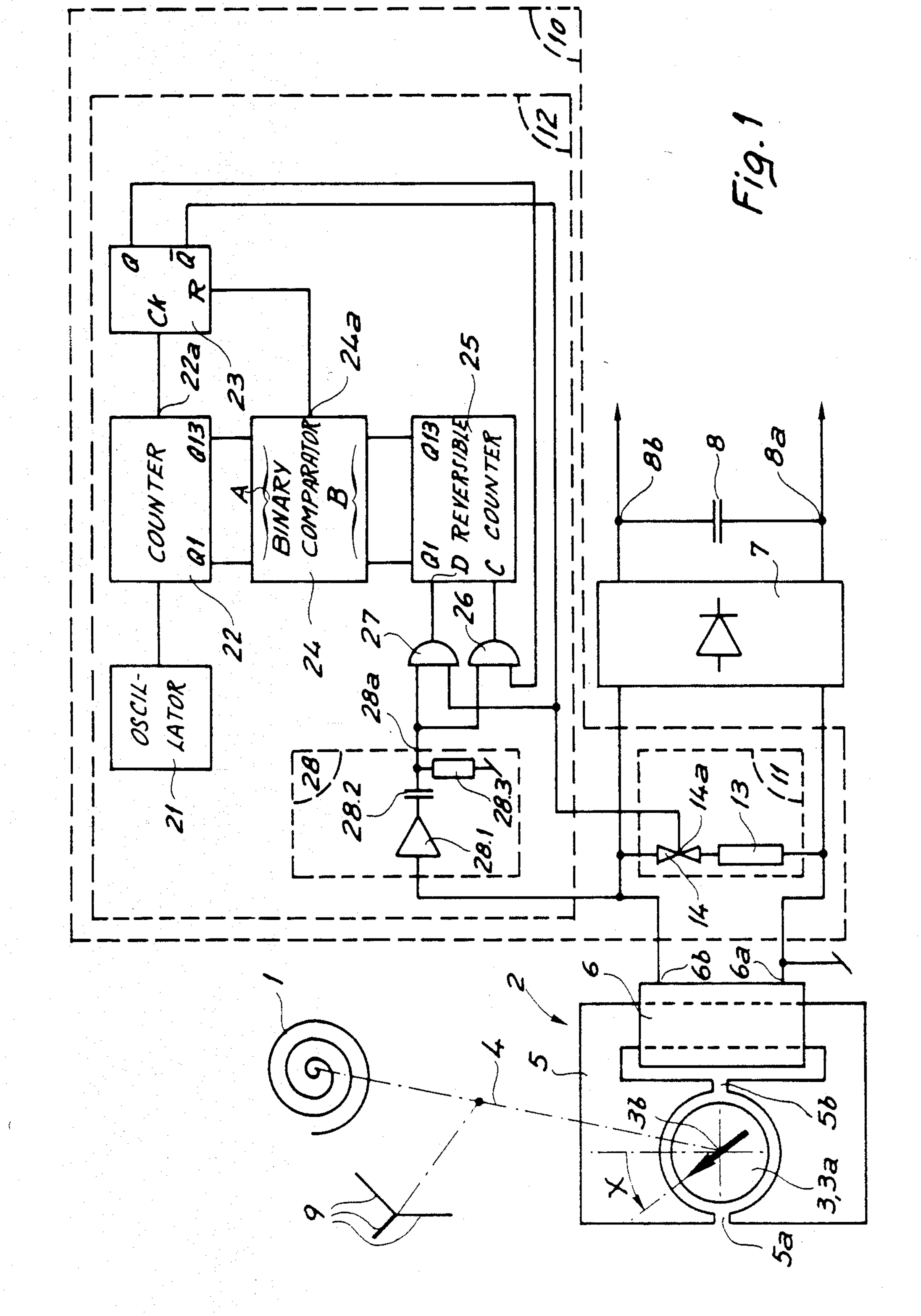
FIG. 1 illustrates schematically a first form of embodiment of the converter according to the invention.

The mechanical-to-electrical energy converter shown in FIG. 1 is designed for use in a timepiece.

It comprises a mechanical energy source 1 consisting of a barrel spring that is shown only schematically since it is of the same kind as those used in mechanical timepieces and therefore well known. Spring 1 is coupled to a manual or automatic winding mechanism, not shown either, since it can be of a type similar to the many mechanisms of this kind known in horology.

The converter shown in FIG. 1 further comprises an electrical energy generator 2, similar to that described in the specification of Japanese Patent Application No. JP-A-85851 mentioned above.

Generator 2, shown schematically, is similar to the stepping motors that are often used in electronic timepieces. Like these motors, it comprises a rotor 3 that includes a bipolar permanent magnet 3*a* having a magnetization axis substantially perpendicular to the rotational axis 3*b* of rotor 3. For the sake of clarity, rotor 3 is not shown in detail in the drawings where it is merely symbolized by magnet 3*a*.

Rotor 3, and thus magnet 3*a*, are rotatably driven about axis 3*b* by spring 1, via a gear-train 4 symbolized by a chain-dotted line.

Generator 2 further comprises a stator 5 which magnetically couples magnet 3*a* to a coil 6.

As in some stepping motors, stator 5 has two air-gaps 5*a* and 5*b* that are symmetrically disposed with respect to the axis 3*b* of rotor 3 and that separate from each other a pair of pole faces which form each the end portion of a pole piece, the opposite end portion of the latter being connected to a respective end of the core of coil 6. Air-gaps 5*a* and 5*b* can in fact be replaced by metallic parts that are integral with the remainder of stator 5 and that have dimensions such that their reluctance is very high.

On the other hand, stator 5 has none of the means, such as notches in the pole faces, that are provided in stepping motors to generate a torque for positioning the rotor.

The converter further comprises a rectifying circuit 7 which transforms the alternating voltage that is generated by coil 6 in response to rotation of magnet 3*a*, into a rectified voltage, and a storage capacitor 8 which filters the rectified voltage and temporarily stores the electrical energy generated by the converter.

Rectifier 7 is not shown in detail, as it can be of a kind similar to those known to the man of the art. It may for instance simply be a bridge rectifier, or a voltage-doubling rectifier. In the latter case, capacitor 8 is best formed by the pair of capacitors that are an integral part of this kind of rectifier.

The electronic cicruits of the converter shown in FIG. 1 and which will be described below are energized by the substantially direct voltage present across the terminals of capacitor 8, via connections not shown.

Obviously, neither terminal 8*a* nor terminal 8*b* of capacitor 8 is at the same electrical potential as terminal 6*a* or terminal 6*b* of coil 6.

In the following description, it will be assumed that the potential on the terminal 6*a* of coil 6 is the reference potential of the converter or, in other words, that terminal 6*a* is connected to the ground of the converter. It will also be assumed that rectifier 7 is so designed that the voltage across terminals 8*a* and 8*b* of capacitor 8 will be substantially symmetrical with respect to the reference potential, the potentials on terminals 8*a* and 8*b* being respectively negative and positive with respect to the reference potential.

Similarly, in the following description of the logic circuits, the points having a potential substantially equal to that on terminal 8*a* or terminal 8*b* will be referred to respectively as being "low" or being "high".

The timepiece fitted with the converter shown in FIG. 1 further comprises time indicating hands 9. It may also comprise a calendar mechanism or other associated mechanisms.

Hands 9, and any associated mechanism, are also connected to spring 1 and to rotor 3 via at least part of gear-train 4.

The average rotational speed of hands 9, which must of course have a clearly defined value, is controlled by a circuit 10 that regulates the rotational speed of rotor 3.

Regulation circuit 10 comprises electric braking means 11 for rotor 3 and a control circuit 12 for braking means 11.

In this embodiment, braking means 11 comprise a braking resistor 13 and an electronic on-off switch 14 made up of a transmission gate which is conductive or non-conductive depending on whether its control electrode 14*a* is high or low respectively.

Braking means 11 are connected directly to the terminals of coil 6 and not to the terminals of capacitor 8 for storing electric energy as in the converter described in the above-mentioned Patent Specification No. CH-B-597636.

In the embodiment shown in FIG. 1 and in the embodiments that will later be described with reference to FIGS. 4, 5 and 6, speed Vc of rotor 3 is set, by way of example, at 4 revolutions per second, and the components of the device, in particular gear-train 4, are so sized that the hands 9 of the timepiece rotate at normal speed when the rotational speed of rotor 3 equals the set speed Vc.

In the converter shown in FIG. 1, the control circuit 12 of braking means 11 comprises a quartz oscillator 21 which generates a signal in the form of pulses having a frequency of 32,768 Hz.

The output of oscillator 21 is connected to the input of a counter 22 made up of thirteen flip-flops connected in cascade, in the conventional manner. The thirteen flip-flops are not shown separately.

Counter 22 thus has a counting capacity of 8,192, i.e. its contents, repesented by the binary number generated by the low or high states of the direct outputs of its thirteen flip-flops, vary periodically and in a cyclical manner, when expressed in decimal notation, from 0 to 8191.

The output 22*a* of counter 22 corresponds to the inverted output, generally known as $\overline{Q}$, of the thirteenth flip-flop of counter 22. Output 22*a* thus generates a signal having a frequency of 4 Hz, i.e. having a period of 250 milliseconds.

The signal switches from low to high whenever the contents of counter 22 change from their maximum value 8191 to their minimum value 0, and go low again 125 milliseconds later.

It will become clear from the following description that the frequency of this signal determines the mean rotational speed of rotor 3, and that the value of 4 Hz is the frequency that provides this mean speed with a value equal to the chosen set value, i.e. 4 revolutions per second.

The signal generated by the output 22*a* of counter 22 will be termed the reference signal.

The output 22*a* of counter 22 is connected to the clock input Ck of a flip-flop 23. Flip-flop 23 is of the T type whereby the states of its outputs Q and $\overline{Q}$ change whenever the reference signal switches from low to high, provided its reset input R is low at the time. When input R is high, the outputs Q and $\overline{Q}$ of flip-flop 23 are respectively low and high, irrespective of the state of input Ck. This last state of flip-flop 23 is termed its state of rest.

The outputs Q of the thirteen flip-flops making up counter 22, of which only the first, Q1, and the last, Q13, are shown, are connected to a first set of thirteen inputs of a binary number comparator 24. Again, only the first and the last of this set are shown. These first inputs will be referred to collectively as the A inputs of comparator 24.

Comparator 24 further comprises a second set of thirteen inputs, which will be referred to collectively as its B inputs. Again, only the first and the last of the B inputs are shown. Comparator 24 also comprises an output 24*a* which is normally low and goes high when the binary numbers defined respectively by the logic states of the A and B inputs are equal. Output 24*a* is connected to the reset input R of flip-flop 23.

The B inputs of comparator 24 are connected to the outputs Q of thirteen flip-flops forming a part of a reversible counter 25. These flip-flops are not shown separately, and only the outputs of the first, Q1, and of the last, Q13, of these flip-flops are shown.

As reversible counter 25 has the same number of flip-flops as counter 22, the counting capacities of both counters are equal.

Counter 25 is designed, in known manner, such that its contents will increase by one unit whenever its incrementing input C goes high, and will decrease by one unit whenever its decrementing input D goes high.

The inputs C and D of counter 25 are connected respectively to the outputs of two AND gates 26 and 27.

The first inputs of gates 26 and 27 are both connected to the output of a forming circuit 28, and their second inputs are connected respectively to the outputs Q and $\overline{Q}$ of flip-flop 23.

The output $\overline{Q}$ of flip-flop 23 is also connected to the control electrode 14*a* of transmission gate 14.

Forming circuit 28 is so designed that its output will generate a pulse whenever the voltage on its input, which is connected to the terminal 6*b* of coil 6, transits through zero when changing from negative to positive values. It comprises, for instance, a high-gain and highimpedance-input amplifier 28.1, a capacitor 28.2 and a resistor 28.3 connected together as shown.

The operation of the converter shown in FIG. 1 will now be described with reference to FIGS. 2*a* and 2*b* wherein diagrams 22*a*, Q23 and 28*a* respectively depict the logic states of the signals measured on the output 22*a* of counter 22, on the output Q of flip-flop 23 and on the output 28*a* of forming circuit 28, and wherein diagrams V and X respectively depict, schematically, the speed of rotor 3 and its angular position with respect to time.

The angular position is given by the angular position of the magnetization axis of magnet 3*a*, and the origin of angle X is chosen arbitrarily as being the position through which rotor 3 transits when, in the absence of current through coil 6, the voltage on coil terminal 6*b* rises through zero or, in other words, proceeds from a negative to a positive value.

This position, referred to as the zero position of rotor 3 in the following description, is one of those where the magnetization axis of magnet 3*a* is perpendicular to a straight line joining the centres of air-gaps 5*a* and 5*b*. It corresponds in practice to the position that rotor 3 goes through when forming circuit 28 generates a pulse.

In the following description, the instants when the reference signal goes high will be referenced t0. This reference is occasionally supplemented by a serial number of distinguishing the various instants t0 from one another.

It will be made clear further on in the description that if rotor 3 were to perform every revolution at a constant mean speed equal to set speed Vc, it would go through its zero position at every instant t0. In actual fact, the means speed of rotor 3 at each revolution is always slightly higher or slightly lower than set speed Vc. Therefore, at every instant t0, rotor 3 is slightly ahead or behind with respect to its zero position. As will also be made clear further on in the description, this state of being ahead or behind is detected by gates 26 and 27 which together form a circuit for comparing the rear angular position of rotor 3 at every instant t0 with its zero position.

The description of the operation of the converter shown in FIG. 1 starts at an instant t0, referred to as t01.

It will here be assumed that rotor 3 has already gone through its zero position at instant t01, and has thus started a revolution referred to arbitrarily as the first revolution, just before instant t01. Forming circuit 28 will thus also have generated a pulse just before instant t01, and the contents of counter 25 will have been given a value N other than zero and other than its maximum value in response to this pulse.

It will be shown further on that, just before each instant t0 and thus also just before instant t01, flip-flop 23 is in its state of rest, and that its output $\overline{Q}$ is thus high. Transmission gate 14 is therefore conductive, and rotor 3 is braked by resistor 13 which is connected in parallel with coil 6. The speed V of rotor 3 is thus low.

It should be noted that when rotor 3 is braked, its speed V is not constant, since the braking torque applied to it depends in particular on the magnetic flux of magnet 3*a* flowing through coil 6, which in turn depends on the angular position of rotor 3. To simplify FIGS. 2*a* and 2*b*, it is the mean speed of rotor 3 while being braked that is referenced V1.

As stated earlier, the reference signal goes high at instant t01.

At instant t01, flip-flop 23 will thus be in a state such that its outputs Q and $\overline{Q}$ are respectively high and low. The latter low state causes transmission gate 14 to become non-conductive. Rotor 3 is thus no longer braked by resistor 13, and its speed V increases rapidly to a high value.

The speed V or rotor 3 is not constant either when rotor 3 is not braked. This speed depends in particular on the current supplied by coil 6 to capacitor 8. Now, as long as the no-load output voltage of rectifier 7, i.e. the voltage that would be measured across its terminals if the latter were not connected to capacitor 8 or to the remainder of the circuit, is less than the voltage across the terminals of capacitor 8, coil 6 generates no current, and rotor 3 is thus subjected to no electric braking. But as soon as the no-load output voltage of rectifier 7 becomes greater than the voltage across the terminals of capacitor 8, coil 6 starts supplying a current that charges capacitor 8. Rotor 3 is thus subjected to an electric braking torque due to the supply of this current. The latter is in fact not constant either since it depends, inter alia, on the rotational speed of rotor 3 and on its angular position. Again for the sake of clarity, it is the means speed of rotor 3 when it is not braked that is depicted in FIGS. 2*a* and 2*b*, this speed being referenced V2.

At every instant t0, and thus at instant t01, the contents of counter 22 drop from their maximum value to zero.

After instant t01, the contents of counter 22 increase regularly, from their zero value, in response to the pulses generated by oscillator 21.

At an instant referenced t11, the contents of counter 22 become equal to the number N in counter 25.

With the binary number applied to the A and B inputs of comparator 24 now being equal, the output 24a of comparator 24 goes high, thus resetting flip-flop 23 to its state of rest.

The output $\overline{Q}$ of flip-flop 23 then reverts to high and transmission gate 14 becomes conductive again. Rotor 3 is braked again by resistor 13 and its speed V returns to a low value.

It will be observed that time T1 between instants t01 and t11, which is the time during which rotor 3 is not braked, is proportional to the number N in counter 25 at instant t11.

The fact that the reference signal goes low 125 milliseconds after instant t01 has no effect on the circuit which remains in the last state described above until one of the following two situations occurs.

Figures 2A, 2B:
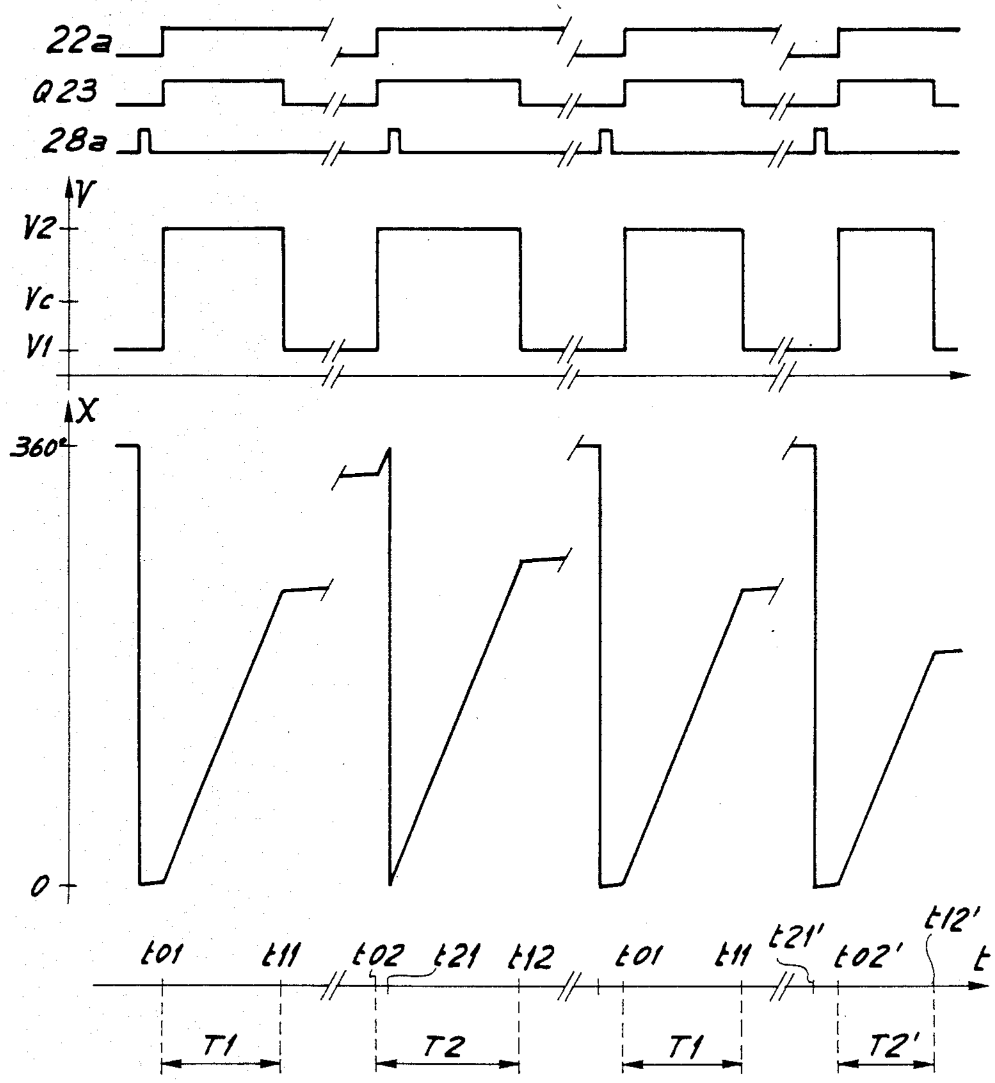
FIGS. 2*a* and 2*b* are diagrams for explaining the operation of the converter shown in FIG. 1.

In the first situation, depicted by FIG. 2*a*, the reference signal reverts to high, at an instant t02, before rotor 3 has completed its first revolution. Rotor 3 is thus lagging.

As indicated earlier, when the reference signal goes high transmission gate 14 becomes non-conductive. A rotor 3 stops being braked from instant t01, it completes its first revolution very rapidly, and starts a second revolution at an instant t21 subsequent to instant t01 and very close to it.

Since the output Q of flip-flop 23 is high from instant t02, the comparing circuit made up of gates 26 and 27 issues a comparison signal in the form of a pulse that appears on the output of gate 26 in response to the pulse generated by forming circuit 28 at instant t21. With the output of gate 26 being connected to the input C of counter 25, the contents of the latter thus come to have a value (N+1) at instant t21, in response to the comparison signal.

At instant t02, the contents of counter 22 drop from their maximum value to zero. After instant t02, as after instant t01, its contents increase regularly in response to the pulses generated by oscillator 21.

When the contents of counter 22 reach a value equal to value (N+1), at an instant t12, the output of comparator 24 again goes high. In the same way as at instant t11, the output $\overline{Q}$ of flip-flop 23 goes high again at instant t12, making gate 14 conductive again and thus causing rotor 3 to be braked by resistor 13.

As during its first revolution, rotor 3 continues to rotate at low speed after instant t12.

In this case, the time T2 that separates instant t01 from instant t12, i.e. the time during which rotor 3 is not braked, is greater than the time T1 mentioned above, since time T2 is proportional to the number (N+1) that is in counter 25 at instant t12, this number being of course greater than the number N that determined the duration of time T1.

The other situation that can occur at the end of the first revolution of rotor 3 is depicted by FIG. 2*b* wherein the left part also corresponds to this first revolution and will not therefore be described again.

In this second situation, rotor 3 completes its first revolution at an instant t21' preceding instant t02' when the reference signal goes high. It is therefore running fast.

Since the output $\overline{Q}$ of flip-flop 23 is still high at instant t21', the comparison signal consists, in this case, of a pulse appearing on the output of gate 27 in response to the pulse generated at instant t21' by forming circuit 28. With the output of gate 27 being connected to the input D of counter 25, the contents of the latter come to have a value (N−1) in response to the comparison signal.

When the reference signal goes high again, at instant t02', the braking of rotor 3 ceases and the rotor comes to rotate at high speed until an instant t12' when the contents of counter 22 come to have the same values as (N−1).

As in other cases discussed earlier, rotor 3 is braked from instant t12' and then continues to rotate at low speed.

In this case, it will be noted that time T2', which separates instant t02' from instant t12' and during which rotor 3 is not braked, is shorter than time T1 above, since it is proportional to number (N−1) in counter 25 at instant t12', this number being of course less than N.

In short, the contents of counter 25 are incremented or decremented depending on whether the comparison signal between the real angular position of rotor 3 at each instant t0 and its zero position shows that it is ahead or behind.

Obviously one or other of the two situations described above will occur at the end of each reference signal period but not necessarily alternately. It is in fact possible, at two or several successive instants t0, for rotor 3 to be always ahead or always behind. The number contained in counter 25 is then respectively decreased or increased each time.

During each period of the reference signal, the means velocity Vt of rotor 3 depends of course directly on the length of time it is not braked and thus rotates at high speed, this time being proportional to the number contained in counter 25. All other things being equal, an increase or a decrease in this number will thus respectively cause an increase or a decrease in the mean speed Vt.

If, at an instant t0, rotor 3 is behind, its means speed Vt during the period of the reference signal that starts at this instant t0 is thus increased compared to its mean speed during the previous period. This increase in the mean speed means that, all other things being equal, rotor 3 will probably be ahead at the next instant t0 or, at least, will be less behind.

The same applies when, at an instant t0, rotor 3 is running fast. In this case, at the next instant t0, rotor 3 will probably be running slow or, at least, its lead will have decreased.

Thus, when the converter is operating, the rear angular position of rotor 3 at each instant t0 oscillates above and below its zero position. The mean angular position of rotor 3 at instants t0, measured over a sufficiently long period, will thus be identical to its zero position.

Consequently, the means speed of rotor 3, also measured over a sufficiently long period, will be equal to set speed Vc. This equality will be maintained irrespective of variations in the driving torque of spring 1 via geartrain 4, inasmuch as spring 1 is not completely let down, and irrespective of possible variations of the mechanical friction and/or of electrical and magnetic losses in the converter.

In short, circuit 10 regulates the mean speed of rotor 3 during each period of the reference signal, on the basis of a comparision, made just before or just after the beginning of this period, between the real position of rotor 3 and the position it would be in were it to rotate permanently at the set speed Vc.

This periodic adjustment is performed by virtue of the fact that circuit 12 systematically opens switch 14 that is in series with braking resistor 13 at the beginning of each period of the reference signal, thus enabling rotor 3 to rotate at a speed greater than Vc, and closes the switch again after a time which is always shorter than the period of the reference signal and which depends on the result of the above comparison, thus causing rotor 3 to be braked down to a speed having a mean value less than Vc.

In the embodiment shown in FIG. 1, the period of the reference signal is equal to the time rotor 3 should take to perform exactly one revolution, i.e. 360°, were it to rotate at the set speed Vc. This period of the reference signal is of course also equal to the period that the voltage supplied by coil 6 should have were rotor 3 to rotate at the set speed Vc.

As a consequence of the above, the angular distance travelled by the rotor when it is not being braked remains approximately constant however much mechanical torque is applied to it: if this torque is large, the speed of the rotor when not being braked is relatively high, but the length of time during which the rotor rotates at this speed is relatively short, and if the torque is small, the speed of the rotor is relatively low, but the length of time during which the rotor rotates at this speed is relatively long.

This property remains, irrespective of the difference between the speed of the rotor when it is braked, or when it is not, and the set speed Vc.

The fact that, in the converter shown in FIG. 1, switch 14 is systematically opened at the beginning of each reference period, ensures that rotor 3 never performs, whatever the circumstances, several consecutive revolutions, nor even one complete revolution, when being braked. At each revolution, rotor 3 rotates for a length of time, that may vary, without being braked and thus at a speed greater than Vc.

Theoretical considerations, confirmed by practical tests, show that all the electric energy consumed by the various electronic circuits in the converter of FIG. 1 during one period of the reference signal can be supplied by generator 2 during that part of this period when rotor 3 is not being braked.

It is thus possible to do without the supply of electric energy from generator 2 when rotor 3 is being braked, since the latter is never braked uninterruptedly for one complete revolution or several consecutive revolutions.

The components of the converter, and in particular braking resistor 13, can thus be so sized that the speed of rotor 3 when being braked will be much less than in the case of the known converter described in Patent Specification No. CH-B-597636. The minimum value of braking resistor 13 is limited only by the fact that the voltage across the terminals of coil 6 must be large enough for forming circuit 28 to operate correctly even when transmission gate 14 is conductive. It would even be possible, in an extreme case, to replace braking resistor 13 by a short-circuit, and so to design forming circuit 28 that the low voltage remaining across the terminals of transmission gate 14 when the latter is conductive will be sufficient for forming circuit 28 to operate correctly.

In practice, the speed of rotor 3 when being braked can be chosen as low as about 1 revolution per second.

The fact that the speed of rotor 3 when being braked can be very low enables Vc to have a much lower value than in the above known converter, this value being however still quite different from the speed of rotor 3 when the latter is being braked.

In the form of embodiment shown in FIG. 1, Vc is four revolutions per second, whereas it cannot be less than eight to ten revolutions per second in the known converter, as explained earlier.

Consequently, the efficiency of the converter shown in FIG. 1 and thus its autonomy are greatly increased compared to those of a known converter using comparable components.

The fact that Vc is chosen to have a value quite different from the speed of rotor 3 when the latter is being braked enables a relatively high value to be chosen for the speed of rotor 3 when it is not being braked.

It follows therefore that the number of turns in coil 6 can be small enough for its volume to be compatible with the space available in a timepiece such as a wristwatch, for its manufacture to cause no particular problems, and thus for its cost price to be low.

Also, since the internal resistance of coil 6 is less than that in the above known converter, the losses due to the Joule effect in coil 6 are also less, thereby further improving the efficiency of the converter.

Finally, the direct voltage that is needed to operate the various electronic circuits is easily obtainable by resorting to a simple, i.e. non-multiplying, rectifier, or at worst a voltage-doubling rectifier, to rectify the alternating voltage supplied by coil 6.

In short, in the converter shown in FIG. 1, the systematic cutting out of braking rsistor 13 at the beginning of each period of the reference signal supplied by counter 22 makes it possible to choose for the set speed of the generator's rotor, a value markedly lower than in the known converter described earlier. All other things being equal, the efficiency and the autonomy of the converter shown in FIG. 1 are thus substantially greater than those of the known converter.

The systematic and periodic cutting out of braking resistor 13 further makes is possible for the direct voltage that is needed to energize the electronic circuits of the converter and any associated circuits, to be produced by means of a generator having a coil with a sufficiently low number of turns for its manufacture and its fitting into a timepiece of small size to cause no problem.

Theoretical calculations confirmed by practical tests have shown that, in the converter shown in FIG. 1, rotor 3 travels at high speed through an angle of approximately 200° to 300° during each revolution, the remainder of each revolution being of course performed at low speed.

It is known that the instantaneous value of the voltage across the terminals of coil 6 depends, in particular, on the product of the instantaneous values of the rotational speed of rotor 3 by a factor generally known as the magnetic coupling factor between magnet 3*a* and coil 6.

The coupling factor, referred to as C1 in the remainder of the description, is equal to the partial derivative, with respect to angle X defined above, of the product of the flux of magnet 3*a* flowing through coil 6 times the number of turns in coil 6. It varies substantially sinusoidally with respect to angle X, its maximum values, one positive and the other negative, corresponding to angular positions of rotor 3 for which angle X is 90° and 270°. This variation is shown schematically in FIG. 3.

Further, generator 2 can only supply electric energy to capacitor 8 when the no-load output voltage of rectifier 7, i.e. the voltage available across its terminals if the latter were not connected to capacitor 8 and to the remainder of the circuit, becomes greater than the voltage across the terminals of capacitor 8.

As a result, immediately after each instant t0, generator 2 supplies no electric energy to capacitor 8, since the instantaneous speed of rotor 3 and the coupling factor C1 both have a relatively low value at that time. Generator 2 would thus be operating on "no load", and the speed of rotor 3 increases very rapidly.

But, as rotor 3 covers at least 200° at high speed, the product of the instantaneous speed of rotor 3 times the coupling factor C1 is bound to reach, during each revolution of the rotor, a value such that generator 2 begins to supply electric energy to capacitor 8.

This supply of electric energy causes, as is well known, a braking of rotor 3 whose instantaneous speed decreases slightly.

This instantaneous speed remains however sufficient for electric energy still to be supplied to capacitor 8 until coupling factor C1 reaches a value such that this supply ceases to be possible, or until control circuit 12 causes rotor 3 to be braked by making transmission gate 14 conductive.

In both cases, no energy whatsoever is supplied to capacitor 8 until the next instant t0, when the process described above is repeated.

Rectifier 7, like all rectifiers, enables the transfer of electrical energy from coil 6 to capacitor 8, but inhibits the transfer of this energy in the opposite direction. The fact that, in the converter shown in FIG. 1, braking means 11 are connected directly to the terminals of coil 6 thus has the further advantage that capacitor 8 cannot be discharged into braking resistor 13 when transmission gate 14 is conductive. The electric energy stored in capacitor 8 can thus in no way be dissipated in braking resistor 13, with the result that, all other things being equal, the efficiency of the converter shown in FIG. 1 and therefore its autonomy can be increased still further with respect to those of the converter described in Patent Specification No. CH-B-597636.

Figure 4:
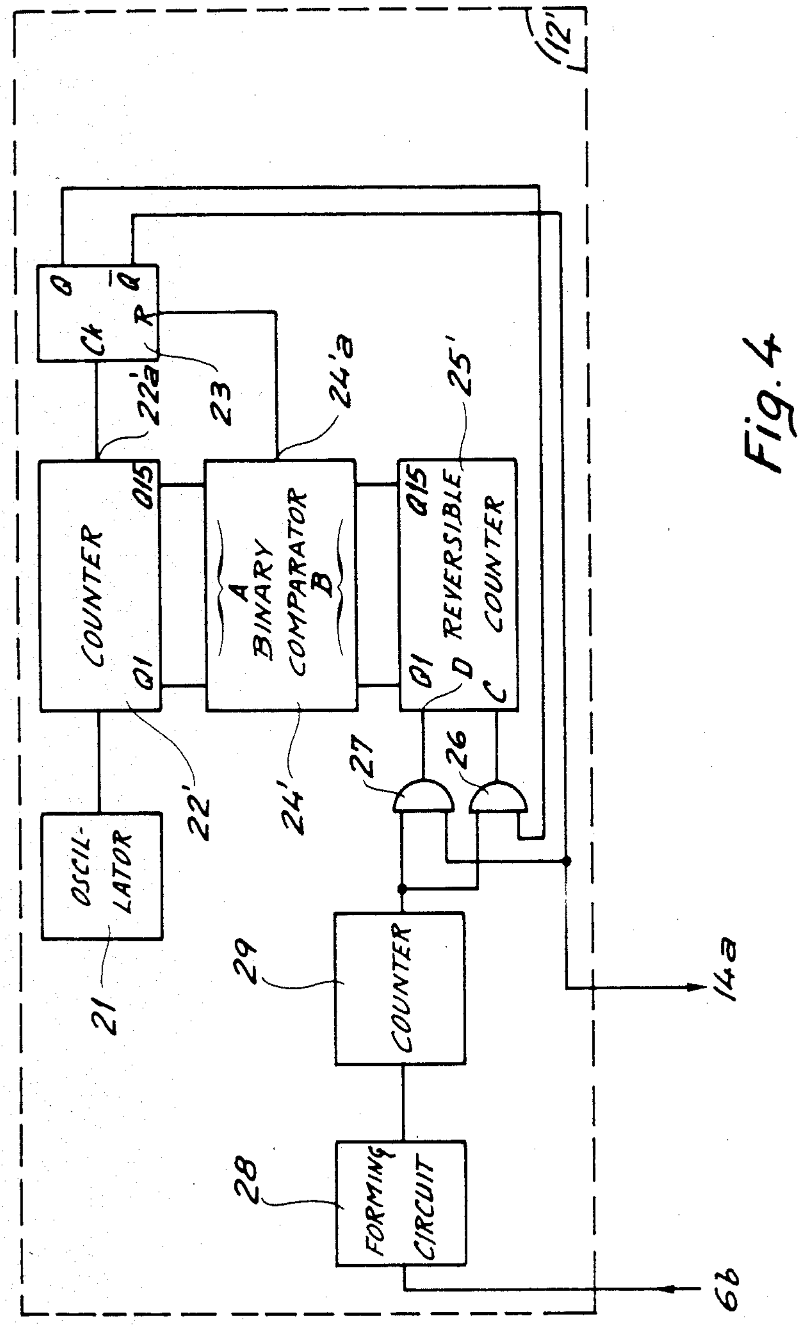
FIG. 4 is a diagram of a modified form of control circuit for braking means shown in FIG. 1.

FIG. 4 is a diagram of a circuit 12' for controlling the braking means 11 of the converter shown in FIG. 1, this circuit being a modification of circuit 12 in FIG. 1.

In circuit 12', counters 22 and 25 of circuit 12 are replaced by other counters 22' and 25' each involving fifteen flip-flops. The counting capacity of counters 22' and 25' is thus equal to 32,768, and the period of the reference signal generated by the output 22'a of counter 22' is equal to 1 second.

Circuit 12' is provided with a comparator 24' similar to the comparator 24 of circuit 12 but having fifteen first inputs A and fifteen second inputs B connected respectively to the fifteen outputs Q of the flip-flops of counters 22' and 25'.

Further, a counter 29 having two flip-flops is inserted between the output of forming circuit 28 and the first inputs of gates 26 and 27. The counting capacity of counter 28 is 4.

The converter comprising control circuit 12' operates as follows:

As in circuit 12, when the reference signal goes high, flip-flop 23 is caused to switch to a state such that its output Q is low, and transmission gate 14, previously conductive, is caused to become nonconductive as a result.

Rotor 3 then ceases to be braked and begins to rotate at high speed.

When the contents of counter 22' become equal to the contents of counter 25', the output 24'a of comparator 24' goes high. The output Q of flip-flop 23 thus reverts to high, transmission gate 14 becomes conductive again and rotor 3 is again braked. Rotor 3 then continues to rotate, at low speed, until the reference signal goes high again.

The pulses that are generated by forming circuit 28 whenever rotor 3 goes through its zero position are counted by counter 29. The output of the latter thus goes high each time rotor 3 has performed four revolutions.

If the output of counter 29 goes high while the output Q of flip-flop 23 is low, which means that rotor 3 is running fast with respect to the position it should be in were it rotating at a speed equal to Vc, the contents of counter 25' are decremented by one unit in response to the comparison signal generated, in this case, by the output of gate 27. The length of time during which rotor 3 will be revolving at high speed during the next period of the reference signal will thus be shorter than during the previous period, so that its mean speed will be lower.

If, on the other hand, this output of counter 29 goes high after the output Q of flip-flop 23 has gone high, which means that rotor 3 is running slow with respect to the position it should be in were it rotating at set speed Vc, the contents of counter 25' are incremented by one unit in response to the comparison signal generated, in this case, by the output of gate 26. The length of time during which rotor 3 will be revolving at high speed during the next period of the reference signal will thus be greater than during the previous period, so that its mean speed will be higher.

Theoretical calculations confirmed by practical tests have shown that, with a circuit such as circuit 12', the contents of counter 25', which determine the length of time during which rotor 3 rotates at high speed, stabilize at a value such that rotor 3 performs approximately three revolutions at high speed and thus about one revolution at low speed.

Circuit 12' thus also periodically regulates the rotational speed of rotor 3. As in FIG. 1, the regulation of the mean speed of rotor 3 is performed during each period of the reference signal in dependence on a comparison, made at the beginning of the period, between the real angular position of the rotor and the position it should be in were it to rotate at set speed Vc. However, in the case of FIG. 4, the period of the reference signal corresponds to the time rotor 3 should take to perform four revolutions, i.e. 1440°, were it to rotate at a mean speed equal to Vc.

The regulation principle described with reference to FIG. 4 is of course applicable, regardless of the value chosen for the angle travelled by rotor 3 between two successive comparison signals and regardless of the value chosen for set speed Vc. This angle is, generally, equal to k. 360°, and factor k can in principle have any value. For the sake of simplicity, an integer value is chosen for k, equal to or greater than 1. It will become apparent, in the description of FIG. 5 below, that a value of 0.5 can be chosen for factor k.

Whatever the value chosen for factor k, i.e. whatever the value of the angle covered by the rotor between two successive comparison signals, the period of the reference signal must of course be equal to the ratio between the angle and the chosen set speed.

Clearly also, the advantages of the converter according to the invention as described above with reference to the form of embodiment shown in FIG. 1, and which are attributable to the fact that the braking resistor of the rotor is periodically cut out, are all to be found in the other forms of embodiment described above, even if, in the latter, rotor 3 can, in come cases, perform more than one revolution at low speed.

The symbol Vt is used in the description of FIG. 1 to indicate the rear mean speed of rotor 3 while it performs, approximately, the only revolution it must perform during each period of the reference signal. This symbol Vt is used in the remainder of the description to indicate, in general, the real mean speed of rotor 3 during one period of the reference signal, irrespective of the actual number of revolutions it performs, approximately, during that period.

As already stated earlier, mechanical and magnetic losses in mechanical-to-electrical energy converters of the kind described above depend directly on the chosen set speed Vc or on its square. It is thus desirable to choose for Vc a value as low as possible in order to reduce these losses and to increase the efficiency of the converter.

The control circuit must however be able to maintain in all cases the mean speed Vt of rotor 3 at a value close to that of chosen set speed Vc.

Speed Vc depends of course, inter alia, on the mean speed of rotor 3 during the periods when it is braked, this mean speed being referenced V1 in FIG. 2.

In order to be able to choose a speed Vc that is low, speed V1 must also be low. The lowest mean speed V1 attainable is that when rotor 3 rotates while the terminals of coil 6 are short-circuited.

However, the instantaneous speed of rotor 3 when braked is not constant. This instantaneous speed depends on the magnetic coupling factor C1 mentioned earlier, between magnet 3a and coil 6. The variation of this factor as a function of the angular position X of rotor 3 is shown schematically in FIG. 3.

All other things being equal, the instantaneous speed of rotor 3 clearly increases when the latter, during the periods when it is braked, approaches positions for which coupling factor C1 is zero, and decreases again when rotor 3 moves away from these positions.

The mean speed V1 of rotor 3 while being braked is adversely affected by these increases of its instantaneous speed, thus imposing a low limit to the value that can be chosen for set speed Vc.

Figure 5:
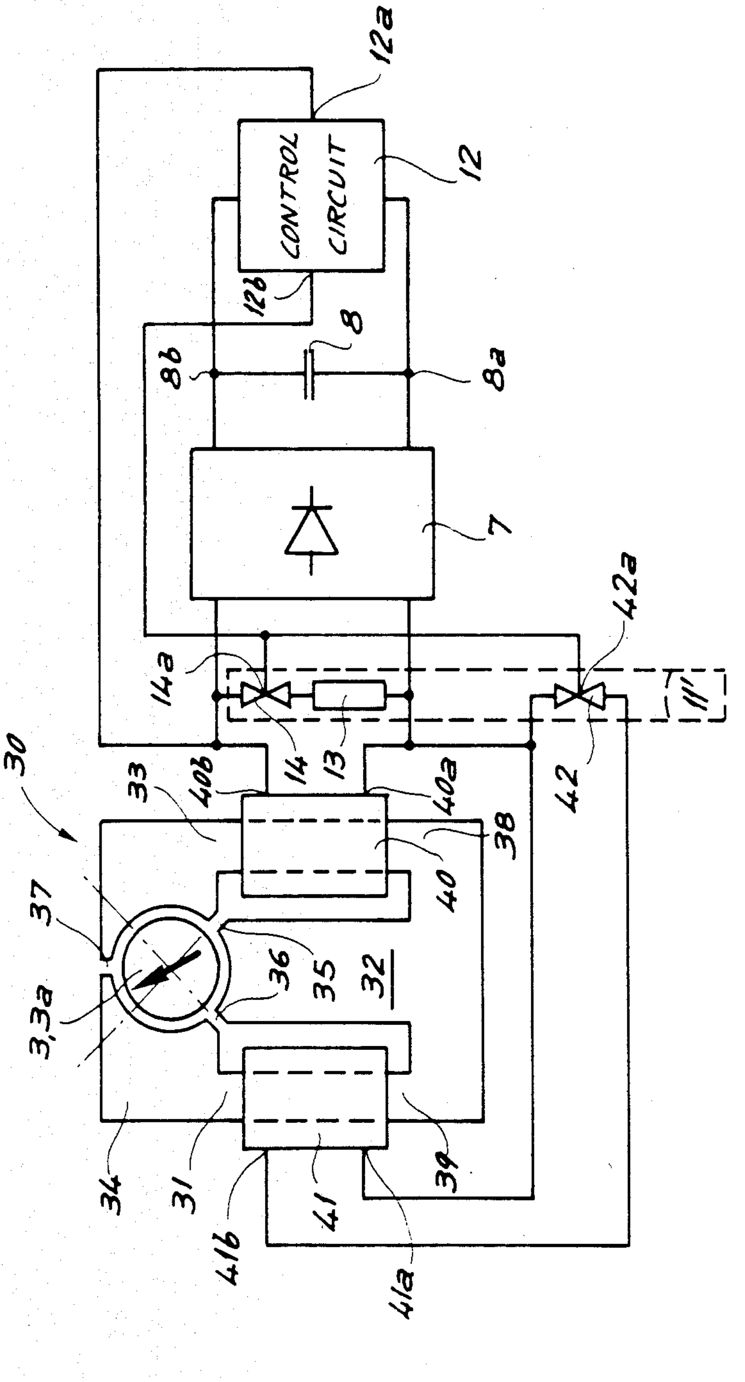
FIG. 5 illustrates schematically a second form of embodiment of the converter according to the invention.

The converter shown in FIG. 5 enables this drawback to be overcome. Like the converter shown in FIG. 1, it is designed to be fitted in a timepiece, and comprises a spring 1 which drives, via a gear-train 4, the rotor 3 of an electric energy generator, here referenced 30, and time display hands 9.

Spring 1, gear-train 4 and hands 9 are not shown in FIG. 5. Rotor 3 is identical to that of generator 2 in FIG. 1, and, as in the latter, it is symbolized by magnet 3*a* that forms a part thereof.

Generator 30, shown schematically, has a structure similar to that of the motor described in U.S. Pat. No 4,371,821. As with this motor, generator 30 has a stator 31 comprising three pole pieces 32, 33 and 34.

The pole faces at one end of pole pieces 32, 33 and 34 are separated from each other by air-gaps 35, 36 and 37 and define a substantially cylindrical space in which permanent magnet 3*a* of rotor 3 is mounted.

The other end of pole piece 32 is connected to the other end of pole piece 33 by an armature 38 and to pole piece 34 by an armature 39. Two coils 40 and 41 are provided on armatures 38 and 39 respectively.

Unlike the motor mentioned above, generator 30 in FIG. 5 has no means for positioning rotor 3.

The converter shown in FIG. 5 comprises a rectifier 7, similar to that in FIG. 1, whose input is connected to the teminals 40*a* and 40*b* of coil 40 and whose output is connected to a storage and filtering capacitor 8, also similar to that in FIG. 1.

The rotational speed of the rotor 3 of generator 30 is regulated by a circuit comprising braking means 11' and by a circuit 12 for controlling braking means 11'. Circuit 12 is identical, in this embodiment, to circuit 12 in FIG. 1, and is therefore not shown in detail again. The input and the output of circuit 12, referenced 12*a* and 12*b* in FIG. 5, correspond respectively to the input of forming circuit 28 and to the output $\overline{Q}$ of flip-flop 23 in FIG. 1.

Braking means 11' include a resistor 13 and a transmission gate 14 that are connected, in series with each other, to the terminals 40*a* and 40*b* of coil 40. Resistor 13 and gate 14 are similar to those in FIG. 1.

Braking means 11' further include a transmission gate 42 connected directly to the terminals 41a and 41b of coil 41. The control electrode 42*a* of gate 42 is connected, like the control electrode 14*a* of gate 14, to the output 12*b* of control circuit 12.

The terminal 41*a* of coil 41 is connected to the terminal 40*a* of coil 40, whose voltage acts as reference voltage for the circuit. Transmission gate 42 thus responds in the same way as transmission gate 14 to the signal generated by control circuit 12. When this signal is low, gates 14 and 42 ae non-conductive, and when it is high, they are conductive.

Finally, the input 12*a* of control circuit 12 is connected to the terminal 40*b* of coil 40.

Coil 40 therefore has the same function as coil 6 in the converter of FIG. 1. It provides, in particular, the electric energy needed to energize circuit 12 and any other circuits, and the voltage on its terminal 40*b* is used by circuit 12 to determine the instants when rotor 3 goes through its zero position.

The magnetic coupling factor of magnet 3*a* with coil 40 varies with the angular position of rotor 3, this variation being, at least at a first approximation, identical to that of coupling factor C1 in FIG. 1. In a generator like that shown in FIG. 5, the angular positions for which the coupling factor is zero are close to those for which the direction of the magnetization axis of magnet 3*a* forms an angle of approximately 60° with a straight line running through the centre of air-gap 35 and through the rotational axis of rotor 3. One of these two positions is the zero position of rotor 3 defined above.

Magnet 3*a* is of course also magnetically coupled with coil 41. The coupling factor C2 of magnet 3*a* with coil 41 varies in a similar way to factor C1, but with zero values close to the angular positions of rotor 3 for which the direction of the magnetization axis of magnet 3*a* forms an angle of approximately 60° with a straight line running through the centre of air-gap 36 and through the rotational axis of rotor 3.

Figure 3:
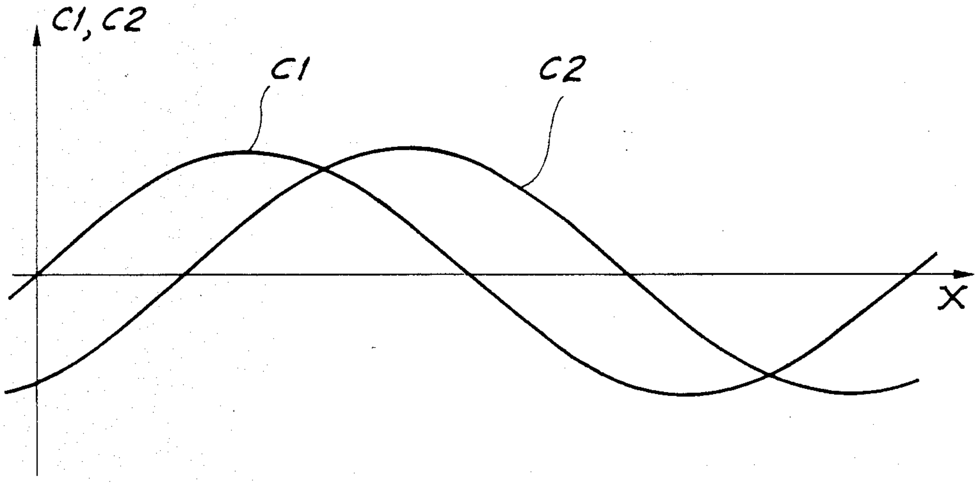
FIG. 3 illustrates schematically the variation that occurs in the coupling factor between the rotor and the coil of the generators shown in FIGS. 1 and 7, or between the rotor and the coils of the generator shown in FIG. 5.

The phase difference between the curves showing the variation of coupling factors C1 and C2 with respect to each other depends of course on the relative angular position of air-gaps 35, 36 and 37. FIG. 3, in which the curve showing the variation of coupling factor C2 is also drawn, illustrates a case where this phase difference is approximately 60°.

The operation of the converter shown in FIG. 5 is identical to that of the converter shown in FIG. 1 and will therefore not be described again.

However the two transmission gates 14 and 42 are either both conductive or non-conductive at any one time, as they are controlled by the same signal.

Consequently, when this signal is low, i.e. during the periods when rotor is not braked, coil 41 is in an open circuit and does not affect the rotation of rotor 3.

But when the control signal generated by circuit 12 is high, i.e. during the periods when rotor 3 is braked, coil 41 is virtually short-circuited by transmission gate 42. Since the coupling factor C2 of coil 41 with magnet 3*a* has a high value when the coupling factor C1 of coil 40 with magnet 3*a* has a low value, coil 41 ensures effective braking of rotor 3 when coil 40 is unable to do so.

Rotor 3*a* is thus braked effectively whatever its angular position, and its instantaneous speed when braked is no longer subject to large variations as in the case of FIG. 1.

As a result of this feature, which is due to the fact that generator 30 is provided with two coils 40 and 41 having coupling factors with magnet 3*a* that are off-set with respect to the angular position of rotor 3, the set speed Vc can be chosen even lower than in the case of FIG. 1, thus proportionately decreasing the mechanical and magnetic losses in the converter and hence increasing its efficiency.

The counting capacity of counters 22 and 25 and, as the case may be, the frequency of the signal generated by oscillator 21 must of course be adapted to the chosen set speed.

Control circuit 12' in FIG. 4 may also be used in a converter comprising the generator 30 of FIG. 5. This modified construction is not described here.

Figure 6:
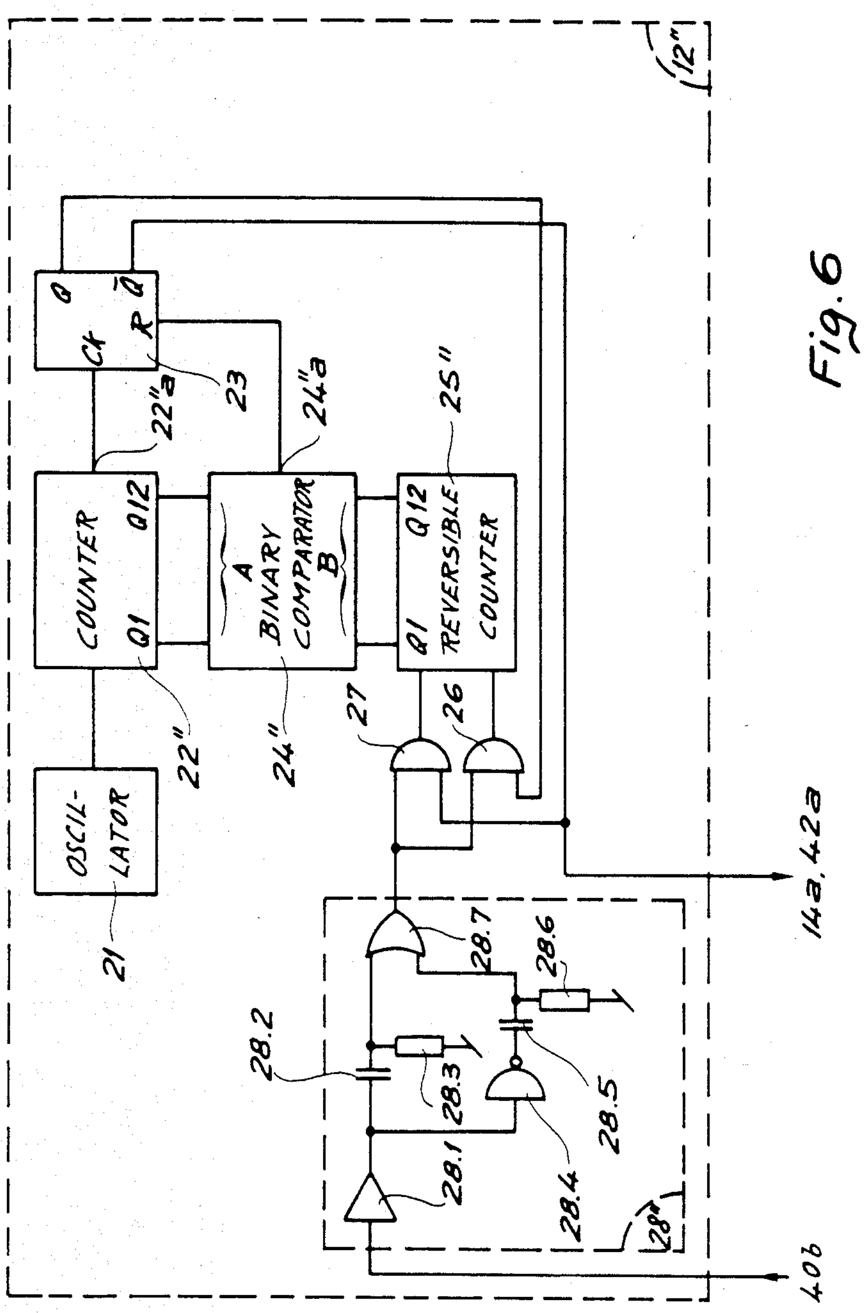
FIG. 6 is a diagram of a modified form of control circuit for braking means shown in FIG. 5.

FIG. 6 is a diagram of a circuit 12'' for controling braking means 11, which may be used instead of circuit 12 in the converter shown in FIG. 5.

In circuit 12″, the counters 22 and 25 of circuit 12 are replaced by counters 22″ and 25″ comprising each twelve flip-flops. The counting capacity of counters 22″ and 25″ is therefore only 4096. The comparator 24 of circuit 12 is of course replaced by a comparator 24″ having twelve first inputs and twelve second inputs, here also referenced A and B. Furthermore, the forming circuit 28 in circuit 12 is replaced by a forming circuit 28″ whose output issues a pulse whenever the voltage across the terminals of coil 40 goes through zero in one direction or the other, i.e. twice per revolution of rotor 3.

Forming circuit 28″ comprises, in this form of embodiment, an amplifier 28.1, a capacitor 28.2 and a resistor 28.3 similar to the components bearing the same references in FIG. 1, an inverter 28.4, a second capacitor 28.5, a second resistor 28.6 and an OR gate 28.7. All of these components are connected to one another as shown.

The other components of circuit 12″ are similar to the components of circuit 12 bearing the same references.

The operation of the converter provided with control circuit 12″ is comparable to that of the converter shown in FIG. 5 and will not be described in detail. It should simply be noted that the period of the reference signal issued by the output 22″*a* of counter 22″ is only 125 milliseconds and that it corresponds to the time it would take rotor 3 to go through half a revolution, i.e. 180°, if its mean speed during this half revolution were equal to set speed Vc, which here again is set at four revolutions per second.

Moreover, as the period of the reference signal corresponds approximately to half a revolution of rotor 3, and as coupling factor C1 of magnet 3*a* with coil 40 reaches a high value during that portion of this period when rotor 3 is not braked, generator 30 generates electrical energy at each half revolution of rotor 3.

The braking of rotor 3 during that portion of the period of the reference signal when it must be braked is however effective since the coupling factor C2 of magnet 3*a* with coil 41 reaches a high value during this portion of the period.

As with the converter shown in FIG. 5, the set speed Vc of rotor 3 can thus be chosen to be less than four revolutions per second. It would of course then be necessary to adapt accordingly the various components of the converter, in particular oscillator 21 and/or counter 22″, whereby the period of the reference signal will have a value corresponding to the chosen set speed.

In the converter shown in FIG. 5 and in the modified construction described above, coil 41 could of course be connected to the input of a rectifier, similar to rectifier 7, whose output would also be connected to storage capacitor 8. In this arrangement, not shown, coil 41 would thus also supply electrical energy to capacitor 8.

Coils 40 and 41 could also be connected in series, at least when rotor 3 is not being braked. The means required for such a connection are not described here, as they are within the scope of a man of the art.

In such a case, the voltage applied to rectifier 7 would of course be higher than in the case of FIG. 5, thereby improving the efficiency of rectifier 7, and hence that of the converter modified in this way.

In the converters described above, the mean speed Vt of rotor 3 during one period of the reference signal beginning at an instant t0 is adjusted by modifying by a fixed amount, at said instant t0, the time T2 or T2′ during which rotor 3 is not being braked in the course of this period, the direction of this modification being determined by the direction of the difference between the real angular position of rotor 3 at instant t0 and its zero position.

In other words, the mean speed Vt of rotor 3 during each period of the reference signal is simply adjusted in dependence on the direction of the difference between mean speed Vt during the previous period and set speed Vc.

This mode of adjustment has the advantage of being particularly easy to carry out. However, depending on the type of converter in which it is carried out, and in particular depending on the mechanical characteristics of the various moving parts of the converter and on the electric and magnetic characteristics of its generator 2, this mode of adjustment is not always the most suitable.

In particular, if the modification of time T2 or T2′ performed at each instant t0 is small, as in the described examples where it is equal to one period of the signal generated by oscillator 21, i.e. approximately 30.5 microseconds, the speed with which the adjustment is made, i.e. the swiftness with which mean speed Vt is brought back to a value close to that of set speed Vc after having for some reason appreciably strayed from it, can also be small.

It is of course possible to increase the swiftness of this adjustment by increasing the variation imposed on time T2 or T2′ at each instant t0.

Depending on the above-mentioned characteristics of the converter, this increase in the swiftness of adjustment may however cause speed Vt to become unstable and hence to oscillate with a relatively high amplitude around set speed Vc.

Many other modes of adjusting mean speed Vt can be used and the choice of the most suitable for one particular type of converter depends of course on the characteristics of the latter.

Of all those modes of adjustment, one may be mentioned, which consists in determining, at each instant t0, the direction of the difference between the real angular position of rotor 3 and its zero position, and also the direction of the variation of the value of this difference with respect to the value it had at previous instant t0, and in modifying time T2 or T2′ in dependence on these two items of information.

This mode of adjustment can be used to advantage in almost any type of converter, since the influence of each item of information it uses, on the value of the modification imposed on time T2 or T2′ can be adapted in dependence on the characteristics of the converter to ensure very swift adjustment of speed Vt while practically eliminating all risk of exaggerated oscillation of speed Vt about set speed Vc.

The means needed for implementing such a mode of adjustment, or any other mode of adjustment more suited to this particular case or to another, will not be described here since their actual nature will depend on the above-mentioned characteristics of the converter and their realization will be within the scope of a man of the art.

In all forms of embodiment of the converter according to the invention described above, the regulation of the mean speed of the rotor is achieved by adjusting, during each period of the reference signal, the length of time during which it rotates at a speed greater than the set speed in dependence on the more or less direct measurement, made at the beginning of this period, of its mean speed during the previous period of the reference signal. This regulation can of course also be achieved by adjusting, during each period of the reference signal, the length of time during which the rotor rotates at a speed lower than the set speed in dependence on the same comparison. Forms of embodiment of converters according to the invention making use of this possibility are not shown, as they can readily be deduced from those described above.

It should also be mentioned that, in all of the above described forms of embodiment of the converter according to the invention, counter 25, 25' or 25" which determines the duration of time T2 or T2', can be so designed that its contents automatically take a predetermined value at the instant when, after the converter starts operating, the voltage across the terminals of capacitor 8 reaches a value sufficient for the electronic circuits it energizes to operate correctly. This predetermined value may for instance be equal to half the maximum value that the contents of counter 25, 25' or 25" can take.

This arrangement, which will not be described in greater detail here since it is within the scope of a man of the art, helps to reduce appreciably the time needed for the mean speed of rotor 3 to stabilize to the set speed when the converter starts operating again after a stop.

In all of the converters described above, rotor 3 rotates permanently, at times at high speed and at other times at low speed. Set speed Vc cannot therefore be given an arbitrarily low value. In practice, the minimum value that can be chosen is approximately two to three revolutions per second.

Figure 7:
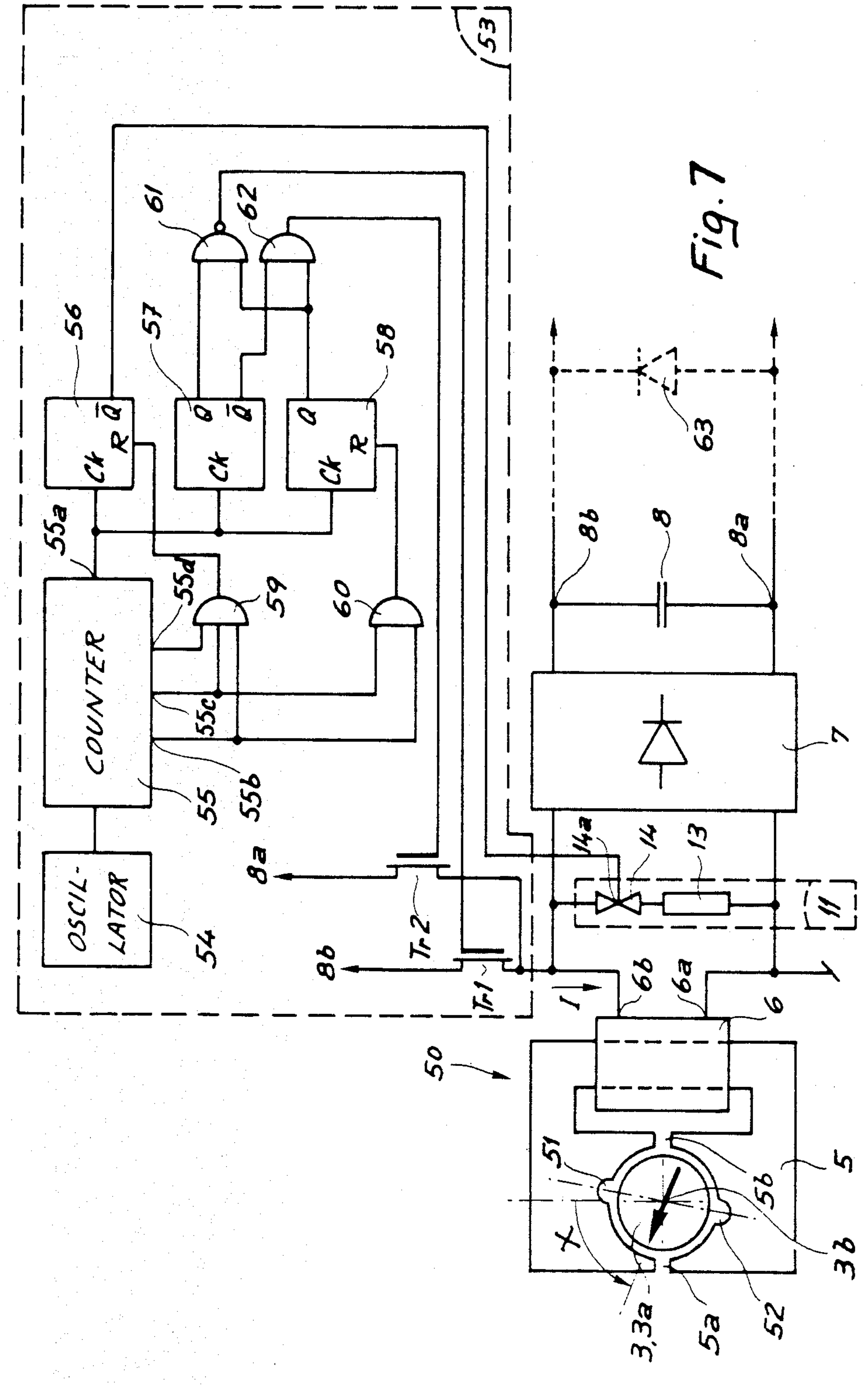
FIG. 7 illustrates schematically a third form of embodiment of the converter according to the invention.

FIG. 7 is a diagram of a converter in which the set speed Vc of rotor 3 can be chosen at a value practically as low as desired. In the FIG. 7 embodiment, the value chosen is 0.5 revolution per second.

The converter shown in FIG. 7 comprises, like those described earlier, a mechanical energy source consisting of a barrel spring similar to those of the previous converters and which is therefore not shown.

This barrel spring is linked, via a gear-train, also not shown, to the rotor 3 of a generator 50. Rotor 3 is also similar to the rotors of the previous converters, and is symbolized, as before, by a permanent magnet **3*a*** that forms part of it.

Generator 50 only differs from generator 2 in FIG. 1 in that it comprises a pair of notches 51 and 52 formed in the pole faces surrounding magnet 31, diametrically opposite each other.

As is known, the purpose of notches 51 and 52 is to generate a torque, generally referred to as a positioning torque, which is applied to rotor 3 and which varies substantially sinusoidally with the angular position of rotor 3 and, with a period of 180°, i.e. half a revolution of rotor 3. This positioning torque is identified as CP in FIG. 8.

Figure 8:
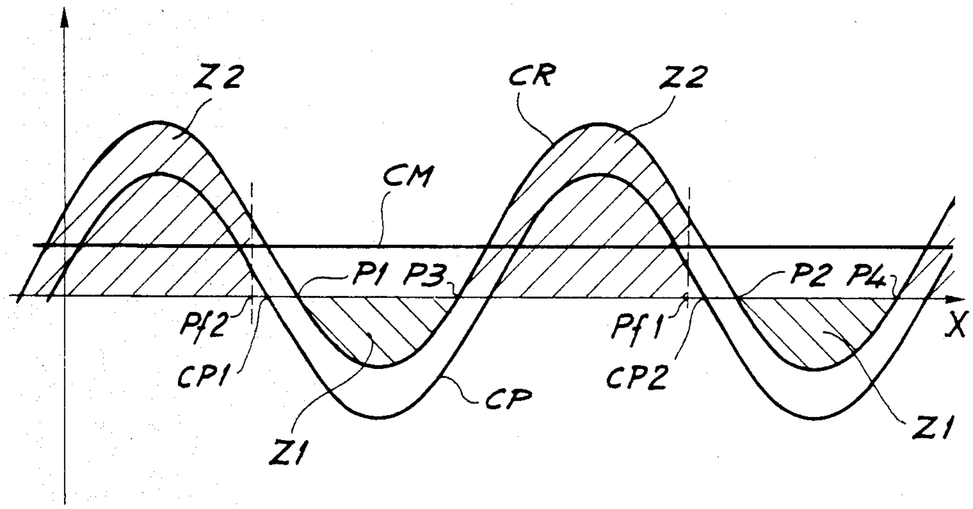
FIG. 8 illustrates schematically the torques to which the rotor of the generator shown in FIG. 7 is subjected.

Conventionally, torque CP tends to cause rotor 3 to rotate in the increasing direction of angle X when shown to be positive in FIG. 8, and in the decreasing direction of angle X when shown to be negative. The same convention will be used for the other torques described later.

In the absence of any other influence, torque CP thus tends to move or to hold rotor 3 in one or other of two stable equilibrium positions, referenced CP1 and CP2 in FIG. 8.

Positions CP1 and CP2 are those where the magnetization axis of the magnet **3*a* of rotor 3 has a direction substantially perpendicular to a straight line joining the centres of notch 51 and notch 52. In the FIG. 7 embodiment, the straight line joining the centres of notches 51 and 52 forms an angle of 10° with a straight line taken as the origin of angles X. As in the example in FIG. 1, the straight line taken as the origin of angles X is perpendicular to a striaght line joining the centres of air-gaps 5*a* and 5*b***.

In the absence of any other influence, the two stable equilibrium positions CP1 and CP2 of rotor 3 are thus those where the magnetization axis of magnet **3*a* forms an angle of 80° with the origins of angles X and an angle of 90° with the straight line joining the centres of notches 51 and 52**.

However, in the converter shown in FIG. 7, rotor 3 is further subjected to the mechanical driving toque transmitted by gear-train 4 that connects it to spring 1. The various components of the converter are so chosen that the maximum value of this mechanical torque will be less than the maximum value of positioning torque CP.

An arbitrary value for the mechanical torque is referenced CM in FIG. 8.

In the absence of any other influence, rotor 3 is thus subjected to a resulting torque equal to the sum of mechanical torque CM and of torque CP. This resulting torque is referenced CR in FIG. 8.

Like that of torque CP, the variation of torque CR is periodic, with a period of 180°. Since, also, the maximum value of mechanical torque CM is less than the maximum value of torque CP, torque CR will have, during one revolution of the rotor, four zero values. Two of these, 180° apart, correspond to positions of stable equilibrium, and the other two, also 180° apart, correspond to positions of unstable equilibrium of rotor 3. In FIG. 8, the two positions of stable equilibrium are referenced P1 and P2 and the two positions of unstable equilibrium are referenced P3 and P4.

The converter in FIG. 7 comprises braking means 11, a rectifier 7 and a capacitor 8 similar to those in FIG. 1 and which will not be described again.

The converter shown in FIG. 7 further comprises a circuit 53 for controlling braking means 11. Circuit 53 includes an oscillator 54 which generates a signal made up of pulses having a frequency of e.g. 32,768 Hz.

The output of oscillator 54 is connected to the input of a counter 55 consisting of fifteen flip-flops not shown separately. These fifteen flip-flops are connected to each other in cascade in conventional manner, thereby providing counter 55 with a counting capacity of 32,768.

Counter 55 has an output **55*a* formed by the inverted output of the fifteenth flip-flop thereby to issue a signal having a period of 1 second. Output 55*a* a is connected to the clock inputs Ck of three flip-flops 56, 57 and 58**, all being of the T type.

Counter 55 further has outputs **55*b*, 55*c* and 55*d* formed by the direct outputs of its fifth, seventh and eighth flip-flops. Outputs 55*b*, 55*c* and 55*d*** therefore generate signals having frequencies of 2048 Hz, 256 Hz and 128 Hz respectively.

The outputs **55*b*, 55*c* and 55*d* of counter 55 are connected to the inputs of an AND gate 59 whose output is connected to the reset input R of flip-flop 56**.

The outputs **55*b* and 55*c* of counter 55 are connected to the inputs of another AND gate 60 whose output is connected to the reset input R of flip-flop 58**.

The output Q of flip-flop 56 is connected to the control electrode **14*a* of transmission gate 14**.

The outputs Q of flip-flops 57 and 58 are connected to the inputs of a NAND gate 61 whose output is connected to the gate of a P-type MOS transistor Tr1.

The output Q of flip-flop 58 is further connected to one input of an AND gate 62 having a second input connected to the output $\overline{Q}$ of flip-flop 57. The output of gate 62 is connected to the gate of an N-type MOS transistor Tr2.

The drains of transistors Tr1 and Tr2 are both connected to the terminals *6b* of coil 6 and their sources are connected respectively to the terminals *8b* and *8a* of capacitor 8. The connections between the sources and terminals *8a* and *8b* are not shown. As in FIG. 1, terminals *8a* and *8b* correspond respectively to the negative terminal and to the positive terminal of the circuit supply.

Figure 9:
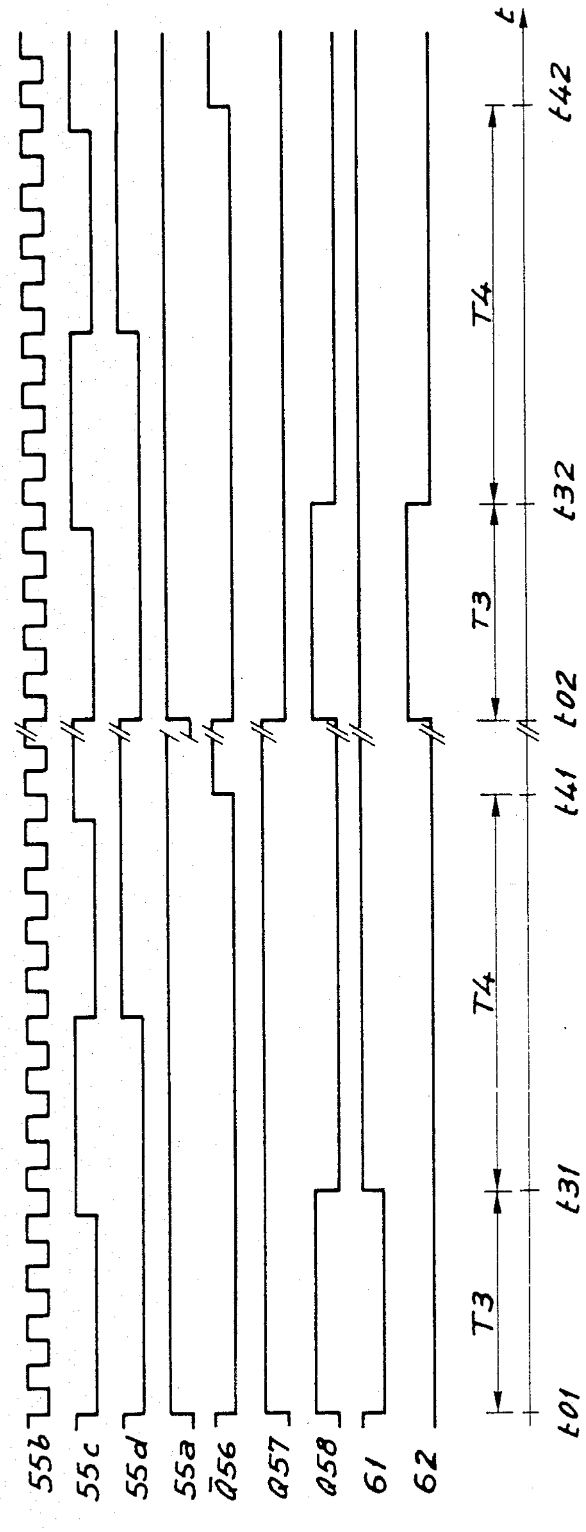
FIG. 9 is a diagram for explaining the operation of the converter shown in FIG. 7.

The operation of the converter in FIG. 7 will be described with reference to FIG. 8, mentioned above, and to FIG. 9 which shows logic states measured at various points of circuit 53.

The output *55a* of counter 55 issues a signal having a period of 1 second which, as will be shown later, forms a reference signal comparable to the reference signals described earlier. The instants when signal *55a* goes high are referenced t0 as above.

As will be made clear later in the description, just before each instant t0, rotor 3 is stopped in one or other of its positions P1 or P2 of stable equilibrium and the output $\overline{Q}$ of flip-flop 56 is high. Transmission gate 14 is thus conductive and braking resistor 13 is connected in parallel with coil 6. If, in this situation, rotor 3 is subjected to an angular acceleration due to, for instance, a shock, it will be braked by torque CR and by the torque due to the current that is induced by the motion of the rotor and which flows through resistor 13, and brought back to its equilibrium position by torque CR.

Also just before each instant t0, the output Q of flip-flop 58 is low. The outputs of gates 61 and 62 are thus respectively high and low, and both transistors Tr1 and Tr2 are non-conductive.

It will be assumed that, before the instant t0 at which this description begins, referenced t01, rotor 3 is stopped in position P1.

It will further be assumed that, again before instant t01, the output Q of flip-flop 57 is low.

It will finally be assumed that coil 6 is designed and arranged on stator 5 in such a way that when its terminal *6b* is connected to the positive pole of the supply, in a way that will be described below, it generates a magnetic field that causes rotor 3 to rotate in the positive direction of angle X when rotor 3 is in its position P1 of stable equilibrium. Similarly, when the terminal *6b* of coil 6 is connected to the negative pole of the supply, the magnetic field generated by coil 6 causes rotor 3 to rotate again in the positive direction of angle X, but when rotor 3 is in its position P2 or stable equilibrium.

At instant t01, the ouput *55a* of counter 55 goes high. At the same instant, the outputs *55b*, *55c* and *55d* of counter 55 go low. The inputs R of flip-flops 56 and 58 therefore go low. The output Q of flip-flop 56 thus goes low, thereby rendering transmission gate 14 nonconductive, and the outputs Q of flip-flops 57 and 58 go high.

The blocking of transmission gate 14 is not sufficient to cause rotor 3 to rotate since the latter is only subjected to torque CR which tends to maintain it in position P1.

At the same time as transmission gate 14 is rendered nonconductive, transistor Tr1 is made conductive by the low state appearing on the output of gate 61. The terminal *6b* of coil 6 is thus connected to the positive pole of the circuit supply and current begins to flow through coil 6, in the direction of arrow I. The magnetic field generated by this current causes the rotor to rotate in the increasing direction of angle X.

Generator 50 therefore operates, immediately after instant t01, as a motor.

At an instant t31 occurring, in this example, 2.2 milliseconds after instant t01, the output *55b* of counter 55 goes high. As the output *55c* of counter 55 is already high at that instant, the output of gate 60 also goes high. Flip-flop 58 therefore switches to a state in which its output Q is low.

Transistor Tr1 is thus rendered non-conductive by the high state on the output of gate 61, and the current flowing through coil 6 is interrupted.

The characteristics of generator 50 and the duration of time T3 separating instants t01 and t31 are chosen such that rotor 3 is close to its position P3 of unstable equilibrium at instant t31 and that, if it has not reached position P3 at that instant, its kinetic energy will be sufficient for it to reach it and go beyond it.

Once rotor 3 has passed position P3, it is driven, still in the increasing direction of angle X, by torque CR which is then positive.

This situation lasts for a time T4, until an instant t41 which occurs, in this example, approximately 6 milliseconds after instant t01, i.e. approximately 3.8 milliseconds after instant t31. At instant t41, the output *55b* of counter 55 goes high whereas the outputs *55c* and *55d* of counter 55 are already high. The output of gate 59 therefore also goes high, thus causing the output Q of flip-flop 56 to go high too. Transmission gate 14 hence becomes conductive, and resistor 13 is connected to the terminals of coil 6.

Rotor 3, which at instant t41 is in an intermediate position Pf1 located between its position P3 of unstable equilibrium and its position P2 of stable equilibrium, is thus braked, and its speed decreases greatly. It continues to rotate at low speed in response to torque CR which decreases to become zero when rotor 3 reaches its second position of stable equilibrium, P2. Rotor 3 thus stops in position P2, after having performed a few oscillations around the latter.

The same process is repeated at the next instant, t02, the only difference here being that flip-flop 57 switches this time to the state in which its output Q is low and its output $\overline{Q}$ is high. It is therefore transistor Tr2 which becomes conductive in response to the high state applied to its control electrode by the output of gate 62.

The terminal *6b* of coil 6 is thus connected, in this case, to the negative pole of the supply, and current begins to flow through coil 6, in a direction opposite to arrow I. Since the rotor is in position P2 at instant t02, the field generated by this current causes rotor 3 to rotate again in the increasing direction of angle X. Generator 50 thus again operates as a motor.

As above, the output of gate 60 goes high after a time T3, at an instant occurring approximately 2.2 milliseconds after instant T02 and referenced T32. The output Q of flip-flop 58 thus goes low again, thereby causing transistor Tr2 to become non-conductive.

Again as above, rotor 3 continues to rotate under the influence of its kinetic energy and of torque CR for a time T4, until the output of gate 59 goes high, at an instant referenced t42 and occurring approximately 3.8 milliseconds after instant t32 when rotor 3 is in an intermediate position Pf2 between its positions P4 and P1.

From instant t42, transmission gate 14 is conductive and rotor 3 is braked. Rotor 3 continues to rotate at low speed until it again reaches position P1 of stable equilibrium, where it stops until the next instant t0. The process described above is of course repeated at each instant t0.

It will be apparent that the mean speed of rotor 3 will in fact be equal to the chosen set speed Vc, i.e. in this example, 0.5 revolutions per second. Moreover, as in the other forms of embodiment described earlier, the period of the reference signal is equal to the ratio between a predetermined rotational angle of the rotor, 180°, and set speed Vc. Factor k mentioned above thus is 0.5, as in the case of FIG. 5.

The mechanical and magnetic losses in the converter shown in FIG. 7, which depend on set speed Vc, are therefore still smaller than in the converters shown in FIGS. 1 and 5.

It will also be apparent that this mean speed is independent of the time actually taken by rotor 3 to perform half a revolution, provided of course that this time does not exceed the period of the reference signal issued by the output 55of counter 55.

If this condition is fulfilled, which is virtually always the case, the mean speed of rotor 3 depends only on the period of the reference signal. In a timepiece having no seconds hand, it would thus be possible to choose a value even lower than 0.5 revolutions per second for the mean speed.

It should however be borne in mind that the lower the mean speed, the greater the storage capacity of capacitor 8 will need to be. This is because capacitor 8 must be able to energize the various electronic components throughout the time between two electric energy bursts from generator 50, without the voltage across its terminals varying too much.

The volume of a capacitor being proportional to its capacity, it may be impossible to choose a very low value for set speed Vc, because the capacitor 8 that would then be needed would be too bulky to be fitted in a timepiece such as, for instance, a watch.

As will be apparent from the foregoing description, each half revolution of rotor 3 involves three phases:

During the first phase, which begins at each instant t0 and ends after a time T3, i.e. approximately 2.2 milliseconds in this example, generator 50 operates as a stepping motor. It receives from storage capacitor 8 a certain amount of electrical energy, which it converts, with a certain efficiency, in a mechanical energy that it uses to drive its rotor from position P1 to position P3 or from position P2 to position P4. The amount of this mechanical energy is proportional to the surface of each of the areas Z1 defined by the X axis and the negative part of curve CR in FIG. 8.

During the second phase, which begins at the end of the first and lasts a time T4, i.e. 3.8 milliseconds in this example, the rotor 3 of generator 50 rotates at high speed under the influence of torque CR. Generator 50 thus produces a certain amount of electrical energy, in the same way as generators 2 and 30 in FIGS. 1 and 5. This amount of electrical energy is substantially proportional to the surface of each of the areas Z2 defined by the X axis and the positive part of curve CR in FIG. 8, between points P3 and Pf1 or P4 and Pf2.

Theoretical considerations not described here but confirmed by practical tests, show that it is possible to provide the various components of the converter with dimensions such that the difference between the amount of electrical energy generated during the second phase and the amount of electrical energy consumed during the first phase is sufficient for the electronic circuits of the converter shown in FIG. 7 to operate correctly until spring 1 is almost completely let down.

During the third phase, which begins approximately 6 milliseconds after each instant t0 in this example and which lasts until rotor 3 stops in one of its positions P1 and P2 of stable equilibrium, generator 50 still generates a certain amount of electrical energy, but this energy is dissipated in resistor 13, causing rotor 3 to be braked. Rotor 3 then remains still until the next instant t0 when the process described above begins all over again.

When the converter shown in FIG. 7 ceases to operate because spring 1 is let down, capacitor 8 of course discharges and the potential difference across its terminals drops to zero.

When spring 1 is wound, after a stop of this type, the converter will not begin to operate again if no adequate means are provided for this purpose, since the mechanical driving torque applied by spring 1 to rotor 3 via gear-train 4 is smaller than the positioning torque generated by notches 51 and 52, and since no electrical energy at all is available in capacitor 8 to overcome the positioning torque.

The means needed to restart the converter may be mechanical. There may for instance consist of a clutch responsive to rapid rotation of a control stem, such as a stem for time-setting a watch, to connect this control stem to rotor 3.

These means may also be electrical. They may for instance consist of a photoelectric cell connected in parallel with capacitor 8 and able to charge the latter on receiving a sufficient amount of light.

A cell of this type is shown in broken lines in FIG. 7, and is referenced 63.

In the converters described above, the rotor of the generator only comprises one permanent magnet having only one pair of magnetic poles. The period of the voltage produced by this generator thus corresponds to one revolution of the rotor. Moreover, the period of the reference signal is equal to the ratio between a predetermined rotational angle of the rotor and set speed Vc, this predetermined angle being equal to k·360°, with k preferably being equal to 0.5 or to an integer equal to or greater than 1.

In all of the forms of embodiment of the converter according to the invention and described hereinbefore, the permanent magnet of the generator's rotor may of course comprise not only one but p pairs of magnetic poles, p being an integer. In such a case, which is not shown, the voltage produced by the generator thus goes through p periods per revolution of the rotor. The predetermined angle mentioned above is then of course equal to k·360° /p since the period of the reference signal must always be equal to the ratio between the predetermined angle and the set speed.

The same considerations apply if the rotor of the generator comprises not only one permanent magnet but, as with the rotor of the generator described in Patent Specification No. CH-B-597636 referred to above, a plurality of magnets arranged at the periphery of a rotary disc. In such a case, number p above is of course equal to half said plurality of magnets.

A generator according to the invention may also not have a stator for magnetically coupling its magnet(s) and its coil(s).

In all of the converters according to the invention described above, the capacitor 8 for storing the electrical energy may readily be replaced by a rechargeable cell.

We claim:

1. A mechanical-to-electrical energy converter comprising:

an electrical energy generator having a rotor and means for generating said electrical energy in response to rotation of said rotor;

means for storing at least temporarily said electrical energy;

a mechanical energy source connected mechanically to the rotor and able to generate a mechanical driving torque for driving said rotor at a first speed greater than a predetermined set speed;

means for generating a periodic reference signal having a period equal to the ratio between a predetermined angle of rotation of said rotor and said set speed;

means for generating a control signal having first and second states including means for putting said control signal into one of said states at each one of a plurality of first periodic instants having a period equal to that of said reference signal, means for generating a comparison signal between the real position of said rotor at each first instant and the position the rotor would be in if it were to rotate at said set speed, and means for putting said control signal into the other of said states in response to said comparison signal; and means for electrically braking said rotor responsive to said first state of the control signal for subjecting said rotor to a braking torque opposed to said mechanical driving torque and imposing on said rotor a second speed lower on average than said set speed, and responsive to said second state of the control signal for stopping the application to the rotor of said braking torque.

2. The converter of claim 1, wherein said braking means are separated from said storage means by at least one unidirectional component enabling the transfer of said electrical energy from said generator to said storage means and prohibiting the transfer of said energy from said storage means to said braking means.

3. The converter of claim 1, wherein said rotor includes a permanent magnet which has at least one pair of magnetic poles defining a magnetization axis and which is rotatably driven with said rotor around an axis of rotation substantially perpendicular to said magnetization axis, and wherein said means for generating said electrical energy include a coil coupled magnetically to said permanent magnet.

4. The converter of claim 3, wherein said means for generating said electrical energy further include a rectifying circuit positioned between said coil and said storage means, and wherein said braking means are connected between said coil and said rectifying circuit.

5. The converter of claim 3, wherein said generator has a second coil coupled magnetically to said permanent magnet and wherein said converter further comprises second means for electrically braking said rotor connected to said second coil and responsive to said first state of the control signal for subjecting said rotor to a second braking torque opposed to said mechanical driving torque and imposing on said rotor a third speed lower on average than said set speed, and responsive to said second state of the control signal for stopping the application to the rotor of said second braking torque.

6. The converter of claim 3, wherein said predetermined angle is equal to k·360° /p, where k is equal to 0.5 or to an integer equal to or greater than 1 and where p is equal to the number of pairs of poles in said permanent magnet.

7. A mechanical-to-electrical energy converter comprising:

an electrical energy generator having a rotor, means for generating said electrical energy in response to rotation of said rotor, and means for subjecting said rotor to a positioning torque;

means for storing at least temporarily said electrical energy;

a mechanical energy source connected mechanically to the rotor and able to generate a mechanical driving torque for driving said rotor at a first speed greater than a predetermined set speed, said mechanical driving torque being smaller than the maximum value of said positioning torque;

means for generating a periodic reference signal having a period equal to the ratio between a predetermined angle of rotation of said rotor and said set speed;

means for generating a control signal having first and second states including means for putting said control signal into said second state at each one of a plurality of first periodic instant having a period equal to that of said reference signal, and means for putting said control signal into said first state at second instants, each separated from the immediately preceding first instant by a predetermined time interval having a length less than said reference signal period;

means for electrically braking said rotor responsive to said first state of the control signal for subjecting said rotor to a braking torque opposed to said mechanical driving torque and imposing on said rotor a second speed lower on average than said set speed, and responsive to said second state of the control signal for stopping the application to the rotor of said braking torque; and means for applying temporarily to said rotor, from each said first instant, an electrical driving torque having the same direction as said mechanial driving torque, the sum of said two driving torques being greater than said positioning torque.

8. The converter of claim 7, wherein said braking means are separated from said storage means by at least one unidirectional component enabling the transfer of said electrical energy from said generator to said storage means and prohibiting the transfer of said energy from said storage means to said braking means.

9. The converter of claim 7, wherein said rotor includes a permanent magnet which has at least one pair of magnetic poles defining a magnetization axis and which is rotatably driven with said rotor around an axis of rotation substantially perpendicular to said magnetization axis, and wherein said means for generating said electrical energy include a coil coupled magnetically to said permanent magnet.

10. The converter of claim 9, wherein said means for generating said electrical energy further include a rectifying circuit positioned between said coil and said storage means and wherein said braking means are connected between said coil and said rectifying circuit.

11. The converter of claim 9, wherein said predetermined angle is equal to k·360° /p, where k is equal to 0.5 and where p is equal to the number of pairs of poles in said permanent magnet.

* * * * *

UNITED STATES PATENT AND TRADEMARK OFFICE
CERTIFICATE OF CORRECTION

PATENT NO. : 4,799,003

DATED : January 17, 1989

INVENTOR(S) : Xuan M. Tu et al.

It is certified that error appears in the above-identified patent and that said Letters Patent is hereby corrected as shown below:

On the title page insert -- [73] Assignee: Asulab S.A. Bienne, Switzerland --.

Cover page, in the Abstract, first paragraph, line 14, "refernce" to --reference--;
Column 5, line 45, change "to" (third occurrence) to --of--;
Column 7, line 3, change "cicruits" to --circuits--;
Column 9, line 41, change "rear" to --real--;
Column 10, line 57, change "A" to --As--;
Column 11, line 63, change "means" to --mean--;
Column 12, line 14, change "rear" to --real--;
Column 12, line 19, change "means" to --mean--;
Column 12, line 29, change "comparision" to --comparison--;
Column 13, line 61, change "rsistor" to --resistor--;
Column 16, line 37, change "come" to --some--;
Column 16, line 40, change "rear" to --real--;
Column 17, line 63, change "ae" to --are--;
Column 22, line 6, change "striaght" to --straight--;
Column 22, line 15, change "toque" to --torque--;
Column 23, line 57, change "or" to --of--;
Column 28, line 43, change "mechanial" to --mechanical--

Signed and Sealed this

Fourth Day of July, 1989

*Attest:*

DONALD J. QUIGG

*Attesting Officer*

*Commissioner of Patents and Trademarks*